US009068707B1

(12) United States Patent
Boxler et al.

(10) Patent No.: US 9,068,707 B1

(45) Date of Patent: Jun. 30, 2015

(54) COMPACT LED LIGHT SOURCE AND LIGHTING SYSTEM

(75) Inventors: Lawrence H. Boxler, Oskaloosa, IA (US); Thomas A. Stone, University Park, IA (US); Matthew D. Drost, Oskaloosa, IA (US); Chris P. Lickiss, Newton, IA (US); Joel D. Rozendaal, Lynnville, IA (US)

(73) Assignee: Musco Corporation, Oskaloosa, IA (US)

( * ) Notice: Subject to any disclaimer, the term of this patent is extended or adjusted under 35 U.S.C. 154(b) by 369 days.

(21) Appl. No.: 13/081,298

(22) Filed: Apr. 6, 2011

Related U.S. Application Data

(60) Provisional application No. 61/321,394, filed on Apr. 6, 2010.

(51) Int. Cl.

| | |
|---|---|
| ***B60Q 1/14*** | (2006.01) |
| ***F21S 8/00*** | (2006.01) |
| ***F21S 13/10*** | (2006.01) |
| ***F21S 8/08*** | (2006.01) |
| ***F21S 4/00*** | (2006.01) |

(52) U.S. Cl.
CPC .. *F21S 8/083* (2013.01); *F21S 8/00* (2013.01); *F21S 4/005* (2013.01)

(58) Field of Classification Search
USPC ........................ 362/153, 153.1, 410, 431, 278
See application file for complete search history.

(56) References Cited

U.S. PATENT DOCUMENTS

| | | | | | |
|---|---|---|---|---|---|
| 5,067,062 | A | | 11/1991 | Riilke | |
| 5,105,347 | A | | 4/1992 | Ruud et al. | |
| 5,253,336 | A | | 10/1993 | Yamada | |
| D373,000 | S | | 8/1996 | Brady | |
| 5,585,783 | A | * | 12/1996 | Hall | 340/473 |
| D381,449 | S | | 7/1997 | Metchear, III | |
| D406,915 | S | | 3/1999 | Metchear, III | |
| 5,906,425 | A | | 5/1999 | Gordin et al. | |
| 5,920,457 | A | | 7/1999 | Lamb et al. | |

(Continued)

FOREIGN PATENT DOCUMENTS

| | | | |
|---|---|---|---|
| WO | WO 01/86198 | A1 | 11/2001 |
| WO | WO 2008/123960 | A1 | 10/2008 |
| WO | WO 2010/042186 | A2 | 4/2010 |

OTHER PUBLICATIONS

American Association of State Highway and Transportation Officials (AASHTO), A Policy on Geometric Design of Highways and Streets, 2001, Fourth Edition, Booklet, 33 pages.

(Continued)

*Primary Examiner* — Jong-Suk (James) Lee
*Assistant Examiner* — Alexander Garlen
(74) *Attorney, Agent, or Firm* — McKee, Voorhees & Sease, PLC

(57) ABSTRACT

A method, system and apparatus including a compact LED light source module comprising a base adapted to mount to a surface or in a fixture; one or more LEDs mounted to an LED mounting interface on the base, the LED mounting interface having a pre-designed geometry related to a pre-designed primary orientation of each LED relative the base; a light transmissive cover over the one or more LEDs, the light transmissive cover having the ability, if needed, to further alter or control the light output distribution of the one or more LEDs; to provide a compact LED light source that can be both substantially standardized but can produce a variety of light output distributions.

25 Claims, 23 Drawing Sheets

(56) References Cited

U.S. PATENT DOCUMENTS

| | | | | |
|---|---|---|---|---|
| 6,065,208 | A | 5/2000 | Lamb et al. | |
| 6,082,878 | A | 7/2000 | Doubek et al. | |
| D437,445 | S | 2/2001 | Porter | |
| D446,330 | S | 8/2001 | Metchear, III | |
| 6,369,411 | B2 | 4/2002 | Matsumoto | |
| 6,402,337 | B1 | 6/2002 | LeVasseur et al. | |
| 6,457,847 | B1 | 10/2002 | LeVasseur | |
| 6,530,675 | B1 | 3/2003 | Van Etten | |
| 6,543,911 | B1 | 4/2003 | Rizkin et al. | |
| 6,679,621 | B2 | 1/2004 | West et al. | |
| 6,814,470 | B2 | 11/2004 | Rizkin et al. | |
| 6,899,443 | B2 | 5/2005 | Rizkin et al. | |
| 6,951,418 | B2 | 10/2005 | Rizkin et al. | |
| 6,971,772 | B1 | 12/2005 | Abdelsamed et al. | |
| 7,012,604 | B1 | 3/2006 | Christie et al. | |
| 7,093,961 | B2 | 8/2006 | Bentley et al. | |
| 7,134,769 | B2 * | 11/2006 | Rohlfing et al. | 362/331 |
| 7,300,327 | B2 | 11/2007 | Bolta et al. | |
| 7,367,686 | B2 * | 5/2008 | Rohlfing et al. | 362/240 |
| D571,495 | S | 6/2008 | Berns et al. | |
| 7,414,546 | B2 * | 8/2008 | Singer et al. | 340/961 |
| 7,449,297 | B2 | 11/2008 | Freije et al. | |
| D589,196 | S | 3/2009 | Stone et al. | |
| 7,503,669 | B2 * | 3/2009 | Rizkin et al. | 362/183 |
| 7,618,163 | B2 | 11/2009 | Wilcox | |
| 7,641,361 | B2 * | 1/2010 | Wedell et al. | 362/240 |
| 7,654,705 | B2 | 2/2010 | Czech et al. | |
| 7,665,862 | B2 * | 2/2010 | Villard | 362/249.02 |
| 7,712,931 | B1 * | 5/2010 | Smith | 362/331 |
| 7,744,246 | B2 | 6/2010 | Rizkin et al. | |
| 7,841,734 | B2 | 11/2010 | Wilcox | |
| 7,866,847 | B2 * | 1/2011 | Zheng | 362/249.03 |
| 7,891,835 | B2 | 2/2011 | Wilcox | |
| 7,976,199 | B2 | 7/2011 | Berns et al. | |
| 8,018,457 | B2 | 9/2011 | Peterson et al. | |
| 8,100,552 | B2 * | 1/2012 | Spero | 362/231 |
| 8,132,944 | B2 | 3/2012 | Ruud et al. | |
| 8,235,546 | B2 * | 8/2012 | Takasago et al. | 362/235 |
| 8,322,893 | B2 * | 12/2012 | Nezu | 362/297 |
| 2002/0191391 | A1 | 12/2002 | Van Etten | |
| 2003/0090910 | A1 * | 5/2003 | Chen | 362/555 |
| 2003/0210555 | A1 | 11/2003 | Cicero et al. | |
| 2005/0057941 | A1 * | 3/2005 | Pederson et al. | 362/542 |
| 2005/0068765 | A1 | 3/2005 | Ertze Encinas et al. | |
| 2006/0176684 | A1 | 8/2006 | Richmond | |
| 2006/0291218 | A1 | 12/2006 | Pazula | |
| 2008/0025020 | A1 * | 1/2008 | Kolb | 362/241 |
| 2008/0037239 | A1 | 2/2008 | Thomas et al. | |
| 2008/0084697 | A1 | 4/2008 | Eberhard | |
| 2008/0192480 | A1 | 8/2008 | Rizkin et al. | |
| 2008/0204888 | A1 * | 8/2008 | Kan et al. | 359/629 |
| 2008/0273333 | A1 * | 11/2008 | Berns et al. | 362/294 |
| 2009/0007978 | A1 | 1/2009 | Alston et al. | |
| 2009/0039065 | A1 | 2/2009 | Nakamura et al. | |
| 2009/0100702 | A1 | 4/2009 | Fair | |
| 2009/0103299 | A1 | 4/2009 | Boyer et al. | |
| 2009/0109670 | A1 * | 4/2009 | Boyer | 362/234 |
| 2009/0284966 | A1 | 11/2009 | Crookham et al. | |
| 2009/0323330 | A1 | 12/2009 | Gordin et al. | |
| 2010/0002432 | A1 | 1/2010 | Romano | |
| 2010/0103672 | A1 | 4/2010 | Thomas et al. | |
| 2010/0110671 | A1 | 5/2010 | Gordin et al. | |
| 2010/0157570 | A1 * | 6/2010 | Xiao et al. | 362/35 |
| 2010/0195326 | A1 | 8/2010 | Boxler et al. | |
| 2010/0290225 | A1 | 11/2010 | Rizkin et al. | |
| 2011/0083460 | A1 | 4/2011 | Thomas et al. | |
| 2011/0149568 | A1 * | 6/2011 | Wilson et al. | 362/235 |

OTHER PUBLICATIONS

Arcadian Lighting, "Bollards and Pagoda Lights at Deep Discount", htt:/www.arcadianlighting.com/bollard-and-pagoda-lights.html, [retrieved from Internet on Apr. 29, 2007]. 4 pages.

Benthin, Carsten et al., "Interactive Headlight Simulation—A Case Study of Interactive Distributed Ray Tracing—" 2 Computer Graphics Group, Saarland University, Technical Report TR-2002-03 (2002), 6 pages.

Argo, "EMC cable glands. AGRO cable glands for interference-free cable installations", Brochure, 2011, 16 pages.

Artic Cooling Freezer 7 Pro Rev.2 92mm Fluid Dynamic CPU Cooler, http://www.newegg.com/Product/Product.aspx?Item=N82E16835186134, [retrieved from Internet on Oct. 19, 2011], 2 pages.

British Standard (BSI), "Code of practice for the design of road lighting—Part 1: Lighting of roads and public amenity areas", BS 5489-1:2003, May 16, 2007, 82 pages.

British Standard (BSI), "Road lighting—Part 2:Performance requirements", BS EN 13201-2003; bought by Musco Sports Lighting on Oct. 15, 2009, 20 pages.

British Standard (BSI), "Road lighting—Part 3: Calculation of performance", BS EN 13201-3:2003, bought by Musco Sports Lighting on Oct. 15, 2009, 44 pages.

British Standard (BSI), "Road lighting—Part 4: Methods of measuring lighting performance", BS EN 13201-4:2003, bought by Musco Sports Lighting on Oct. 15, 2009, 18 pages.

Beta LED, a Division of Ruud Lighting, "uncompromising Brilliance", Brochure, 2009, 24 pages.

CIE, "Technical Report—Glare Evaluation System for Use within Outdoor sports and Area Lighting" ISBN 3 900 734 55 U, CIE 112-1994, 15 pages.

Cree, "Cree® XLamp® XP-E LEDs" Product Family Data Sheet, CLD-DS18 Rev. 12, 2008-2010, 16 pages.

Cree, "Cree® XLamp® XP-G LEDs" Product Family Data Sheet, CLD-DS20 Rev. 5, 2009-2011, 12 pages.

Cree, "Cree® XLamp® XR-E and XR-C LED" Binning & Labeling, CLD AP12, Rev. 8, 2004-2010, 15 pages.

Granet, Irving et al., "Thermodynamics and Heat Power" Seventh Edition, ISBN 0-13-110672-4, copyright 2004, 2000, 1996, 1990, 1985, 1980, 1974, 8 pages.

Illuminating Engineering Society of North America (IES) the Lighting Authority "American national Standard Practice for Roadway Lighting" ANSI/IESNA RP-8-00, Jun. 27, 2000, 5 pages.

Illuminating Engineering Society of North America (IES), IESNA Lighting Education, Fundamental Level, IESNA ED-100, TM-11-00, 3 pages.

Illuminating Engineering Society of North America (IES), "Light Trespass: Research, Results and Recommendations", IESNA TM-11-2000, ISBN 87995-174-5.

International Dark-Sky Association (IDA), "Simple Guidelines for Lighting Regulations for Small Communities, Urban Neighborhoods, and Subdivisions", 2 pages.

Jin, Xiaogang et al, "Analytical methods for polynomial weighted convolution surfaces with various kernels", Computers & Graphics 26 (2002) pp. 437-447.

Leadford, Kevin F. "Illuminance Calculations—The Lumen Method", IESNA ED-150.5A, 1993, 72 pages.

Lighting Research Center, NLPIP "Lighting Answers", vol. 7, Issue 2, Mar. 2003 (revised 2007), 22 pages.

Luxdrive, "3021/3023 BuckPuck", COM-DRV-3021-00, Jul. 2005, 8 pages.

Luxim, AN005: LIFI-ENT-30 Solution for Entertainment Lighting (Moving Ahead), published Apr. 1, 2008, 6 pages.

Luxim "LiFi ENT 31-02™ Light Emitting Plasma for Entertainment Lighting" Product Bulletin, 2 pages.

"MIRO", Anomet 2006 Brochure, 2 pages.

Musco Lighting, "Control-Link®", 2011 Brochure, 1 page.

Newport, "Light Shaping Diffusers®", Optics 551 Brochure, 2 pages.

Numerical Recipes in Fortran 77: The Art of Scientific Computing, "6.7 Bessel Functions of Fractional Order, Airy functions, Spherical Bessel Functions", ISBN 0-521-43064-X, copyright 1986-1992, pp. 234-2245.

Paulin, Douglas, "Full Cutoff Lighting: The Benefits", IESNA LD+A/Apr. 2001, pp. 54-56.

Philips, Lumileds "Thermal Design Using LUXEON® Power Light Sources", Application Brief AB05 Jun. 2006, 12 pages.

(56) References Cited

OTHER PUBLICATIONS

Philips, "Radiation Patterns", http://www.lumileds.com/technology/radiationpatterns.cfm [retrieved from Internet on Apr. 28, 2007], 1 page.
Philips, "power light source LUXEON® Emitter", Technical Datasheet DS25, May 2007, 19 pages.
The Unico System "Homeowner Product Information Guide", Brochure, 4 pages.
The Unico System "2.5" Duct with Threaded Outlet Brochure, 2 pages.
Vose, Michael D., "The Simple Genetic Algorithm Foundations and Theory" Book, 42 pages.

* cited by examiner

SIDE VIEW

DETAIL C

COMPACT LED LIGHT SOURCE AND LIGHTING SYSTEM

CROSS-REFERENCE TO RELATED APPLICATIONS

This application claims priority under 35 U.S.C. §119 to provisional application Ser. No. 61/321,394 filed Apr. 6, 2010, herein incorporated by reference in its entirety.

I. BACKGROUND OF INVENTION

The present invention generally relates to lighting. More specifically, the present invention relates to LED lighting.

There is a need for a controlled lighting source using LEDs which maximizes light utilization, reduces glare/spill, and which can be easily mounted and aimed.

II. SUMMARY OF INVENTION

Aspects of the invention provide an optical module using a compact LED light source which is configured for controlled distribution of light in a particular pattern. These modules may be used to provide useful lighting at very low wattage/lumen output levels, and may be mounted by standardized means within various types of fixtures. The assembled module projects an elliptical light pattern that shines down (relative to the horizontal axis of the optical module as defined below), and mostly to either side of the luminaire. One or more modules may be mounted in fixtures which will further control the beam pattern.

Aspects of the invention provide a system of lighting wherein a module having a standardized configuration is used in hconjunction with standardized fixtures having an aesthetic housing and specific pattern control optics in order to provide lighting that can be customized for a particular application.

These and other objects, features, advantages, or aspects of the present invention will become more apparent with reference to the accompanying specification.

III. BRIEF DESCRIPTION OF THE DRAWINGS

From time to time in this description reference will be taken to the drawings which are identified by figure number and are summarized below.

FIG. 1 illustrates a compact LED light source module according to an exemplary embodiment of the current invention.

FIGS. 2A-F illustrate the compact LED light source module of FIG. 1 according to aspects of the current invention. FIG. 2A is an exploded isometric view of FIG. 1 including mounting hardware. FIG. 2B is similar to FIG. 1 but showing an optional modification to block some light from the module. FIG. 2C illustrates two rear views of lens cover 22 along views A-A and B-B at two slightly different viewing angles as illustrated by the side elevation views at the right side of the figure. FIG. 2D is a side elevation view of lens cover 22. FIG. 2E is a front elevation view of FIG. 1 (bottom) with the same view illustrated with a portion of lens 22 removed. FIG. 2F is similar to FIG. 1 with a broken away portion showing components in the interior of the module.

FIGS. 3A-L illustrate a circuit board and associated components that can be used with the light source module of FIG. 1 according to aspects of the current invention. FIG. 3A is a top view of the circuit board 40. FIG. 3B is a front elevation of FIG. 3A. FIG. 3C illustrated Detail C of FIG. 3B. FIGS. 3D-F are plan views of circuits that could be used with the board of FIG. 3A. FIG. 3G is a 3D isometric view of FIG. 3A (without electrical leads). FIG. 3H is a top edge plan view of FIG. 3G with diagrammatic illustration. FIG. 3I is similar to 3H but showing an optional additional optic for each LED. FIG. 3J is similar to FIG. 3H but with a different diagrammatic illustration. FIG. 3K illustrates relative scale of the module of FIG. 1. FIG. 3L is similar to FIG. 3H with a diagrammatical illustration.

FIG. 4 illustrates the module of FIG. 1 installed in a pattern control optic according to aspects of the current invention.

FIGS. 5A-C illustrate diagrammatically light patterns from modules of FIG. 1 installed in elevating structures according to aspects of the current invention.

FIGS. 6A-H illustrate diagrammatically light patterns according to aspects of the current invention.

Figure 4:
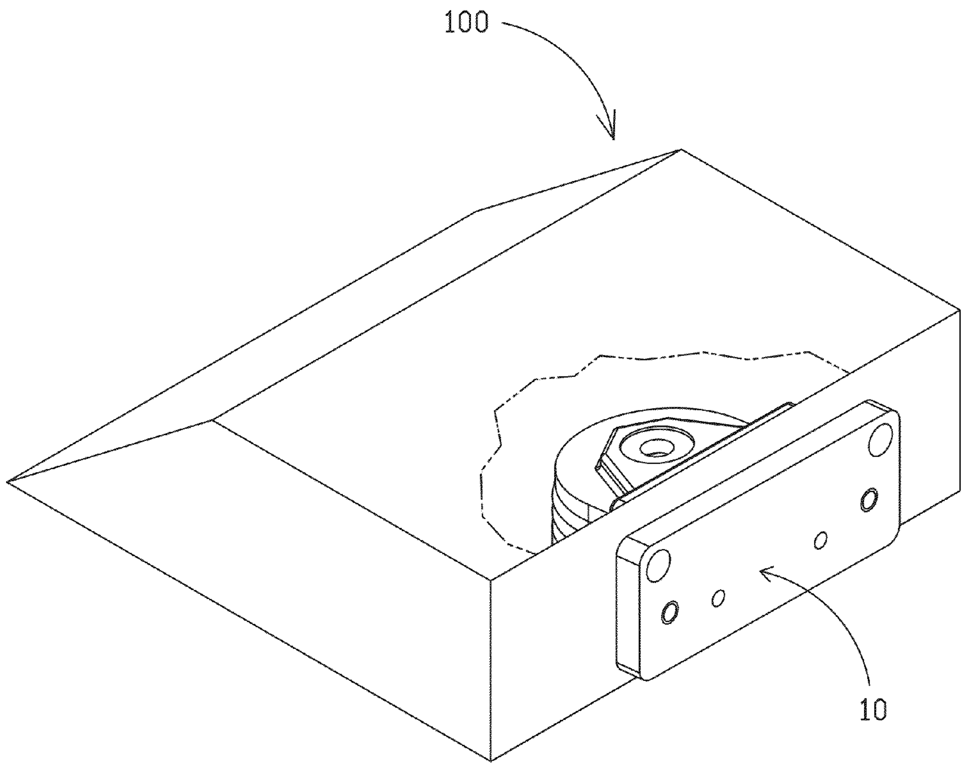

FIGS. 9A-D illustrate adjustable aspects of the light source and pattern control optic of FIG. 4 according to aspects of the current invention.

Figure 10A:
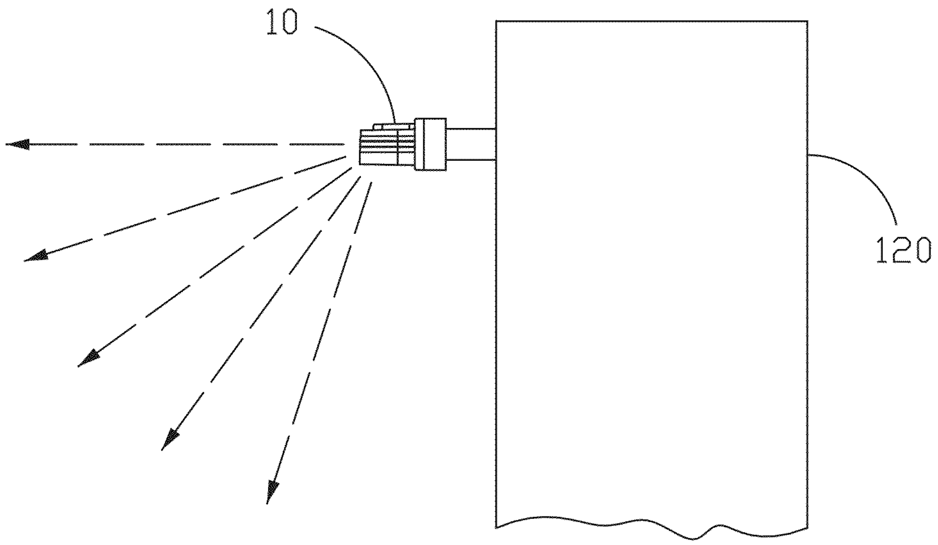
Figure 10B:
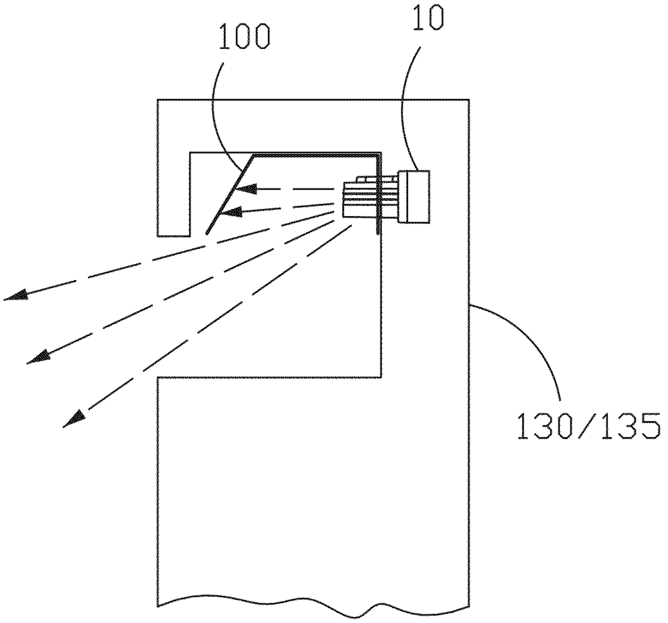
Figure 10C:
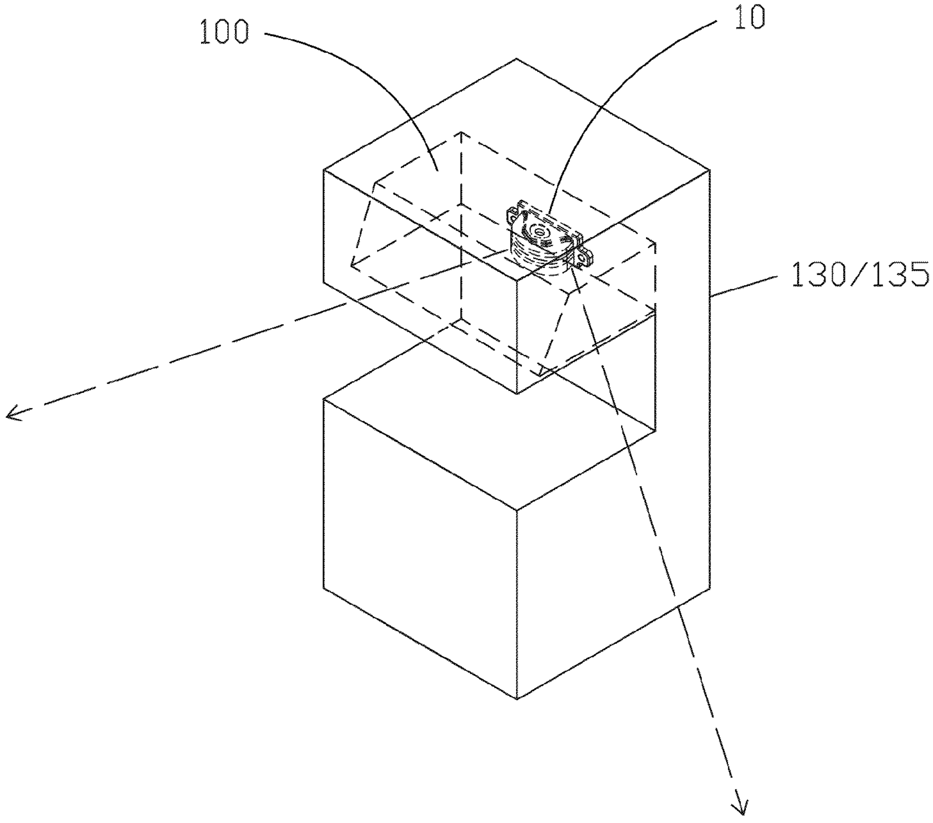

FIGS. 10A-C illustrate light module usage according to aspects of the current invention.

IV. DETAILED DESCRIPTION OF EXEMPLARY EMBODIMENTS

A. Overview

To further understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings unless otherwise indicated.

B. Exemplary Method and Apparatus Embodiment 1

Description

Figure 1:
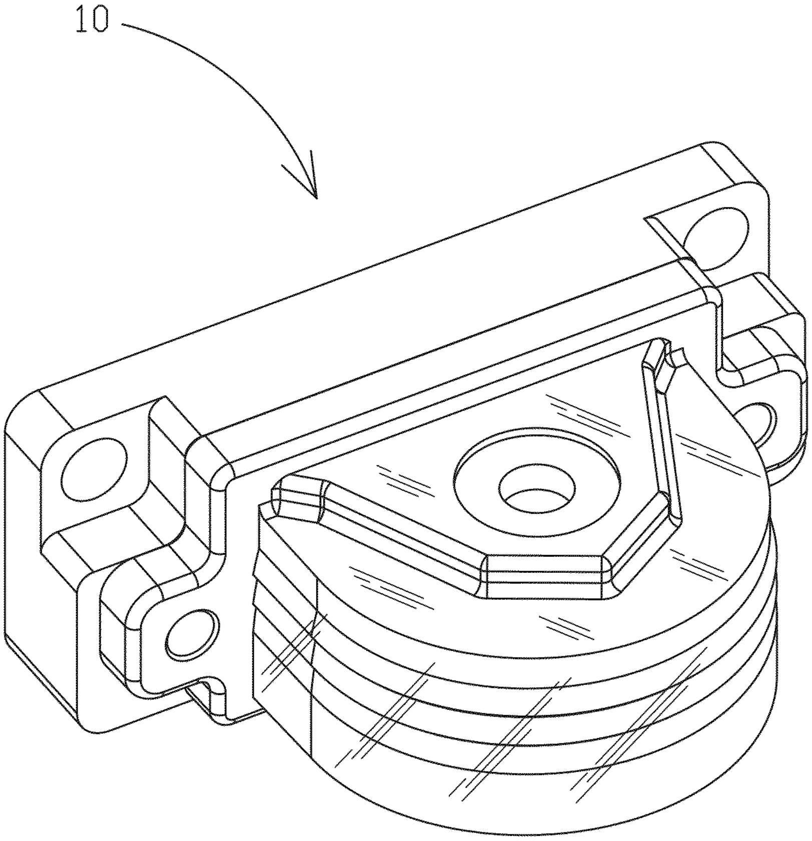
Figure 2A:
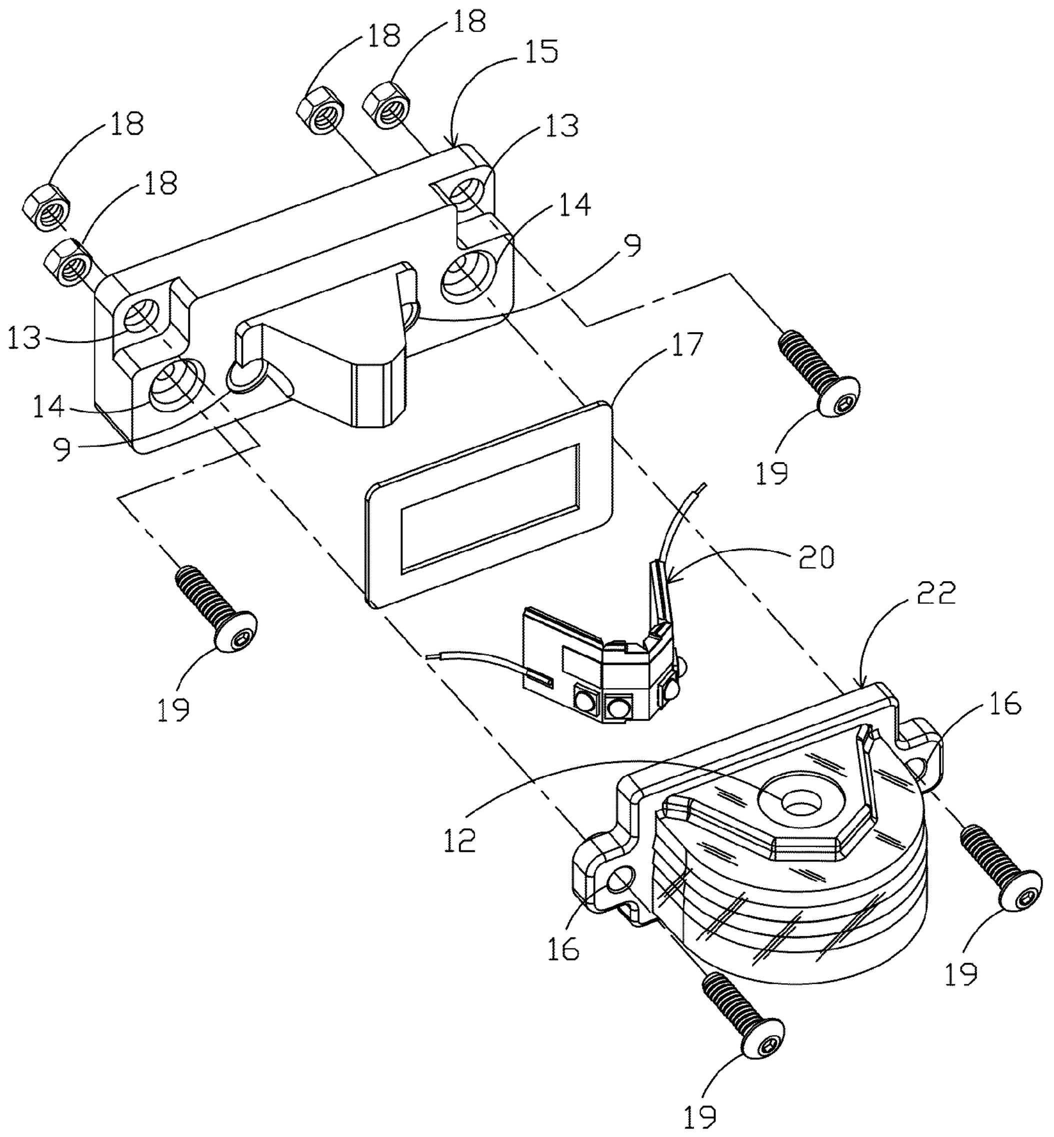

An embodiment according to aspects of the invention comprises a compact LED light source 10, FIG. 1, having an internal light board 20, FIG. 2A, containing a plurality of LEDs 30 (FIG. 3A) which is installed on the mounting base 15, FIG. 2A. The light board 20 forms four individual planes about a vertical axis, each plane having one LED affixed.

Figure 3A:
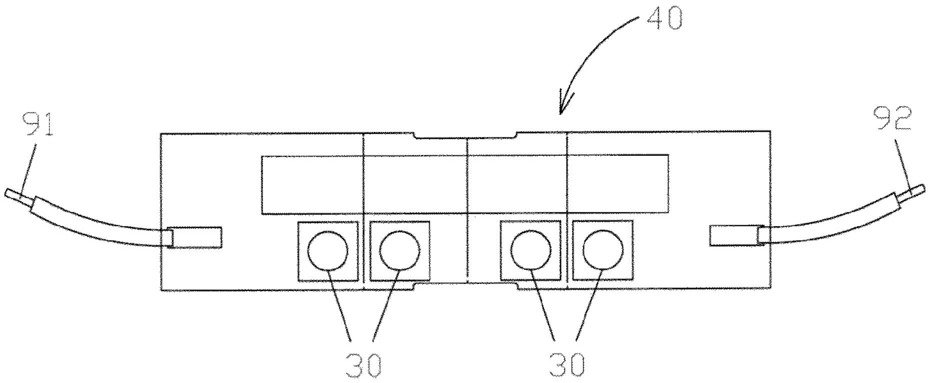
Figure 3B:
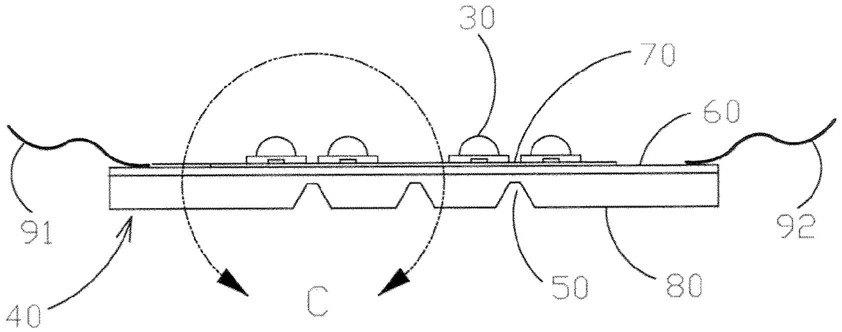
Figure 3C:
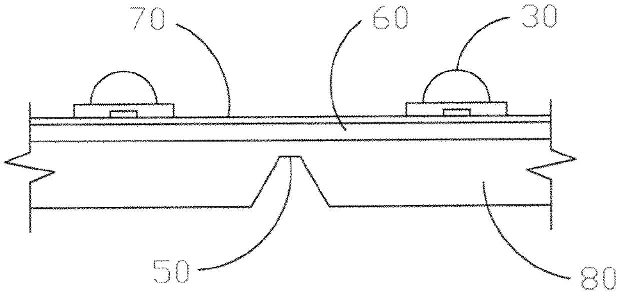
Figure 3D:
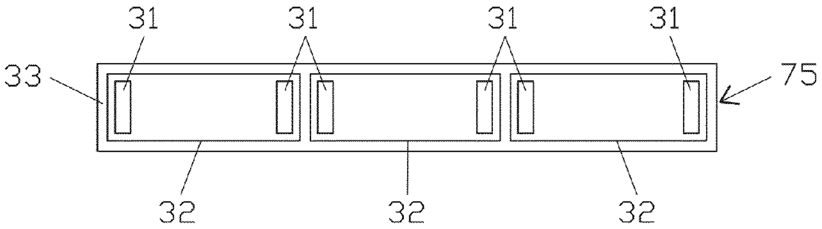
Figure 3E:
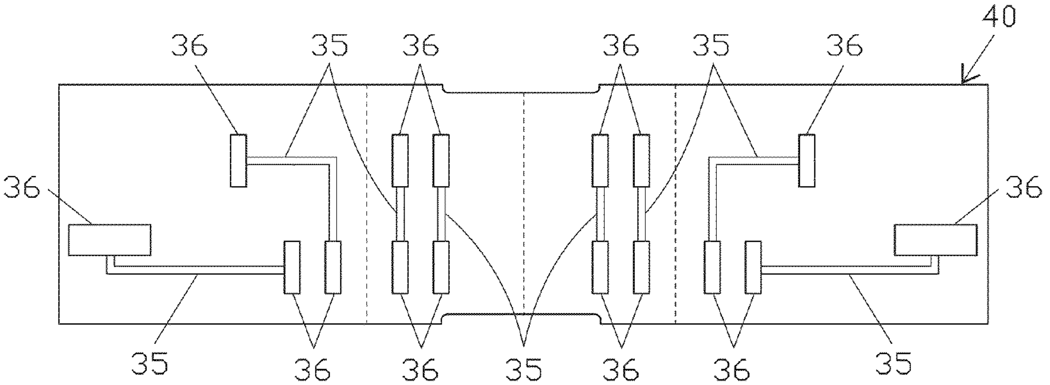
Figure 3F:
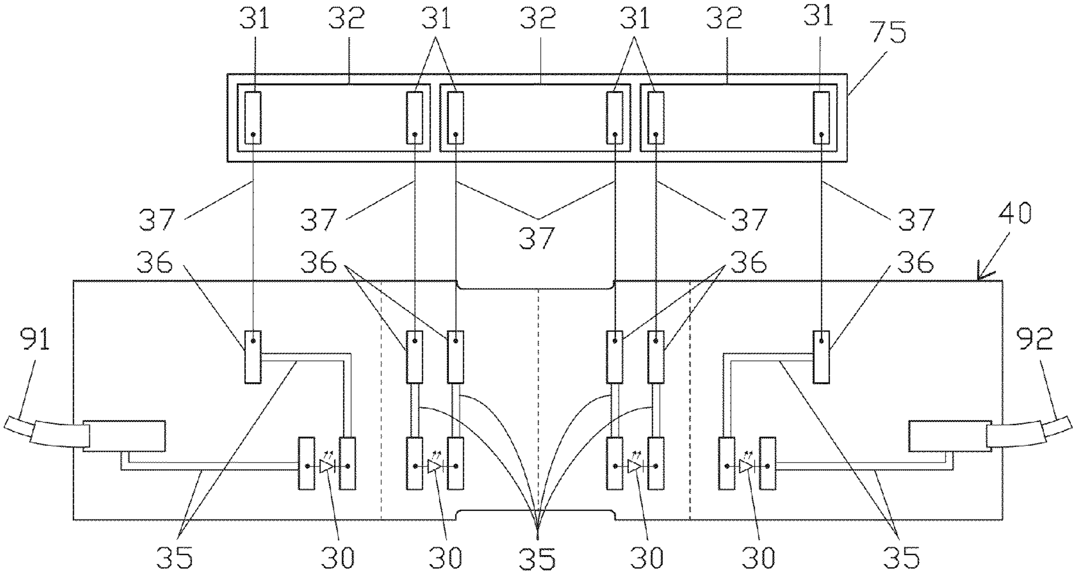
Figure 3G:
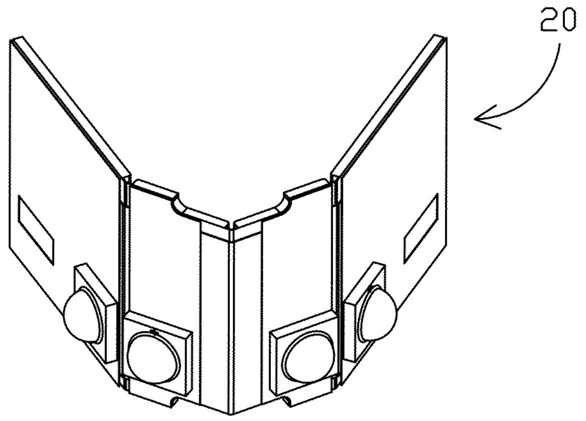
Figure 3H:
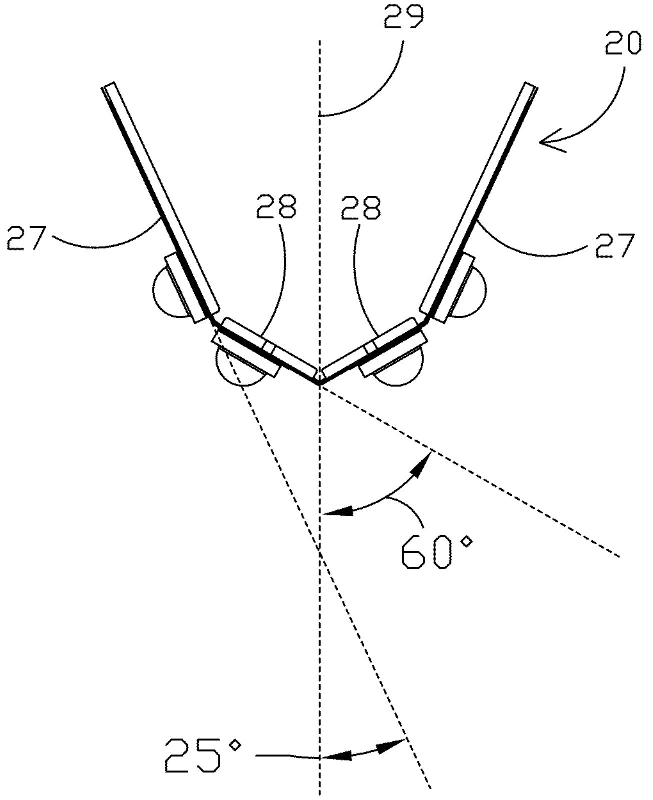

FIG. 3H illustrates typical forming geometry for board 20. In the top view of board 20, plane 29 bisects the board. Angles of faces 27 and 28 are selected to provide smooth blending of the light from adjacent LEDs. Central faces 28 each form a 60 degree angle from plane 29. Outside faces 27 each form a 25 degree angle from plane 29. Other angles are possible of course, depending on specific usage conditions, LED type selection, use of additional optics, etc. for the compact light source 10.

Figure 3I:
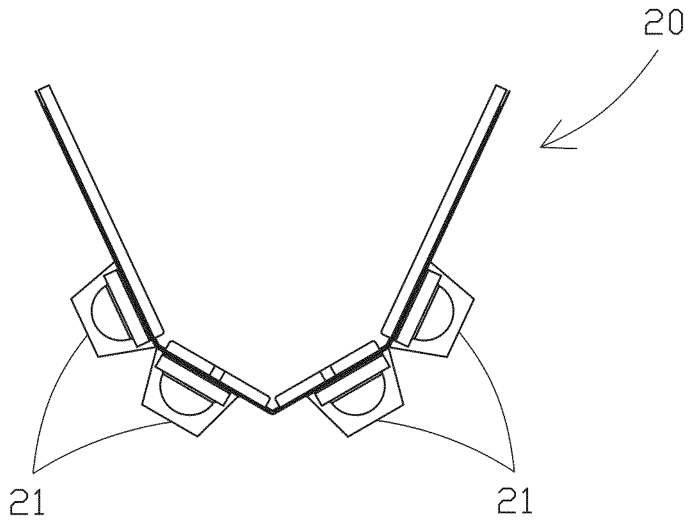
Figure 3J:
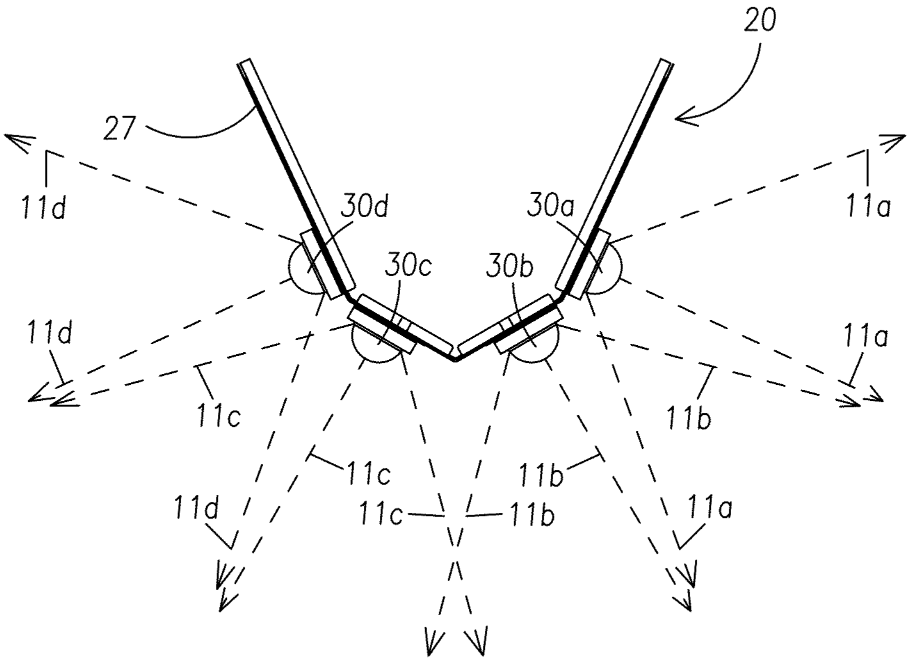
Figure 3K:
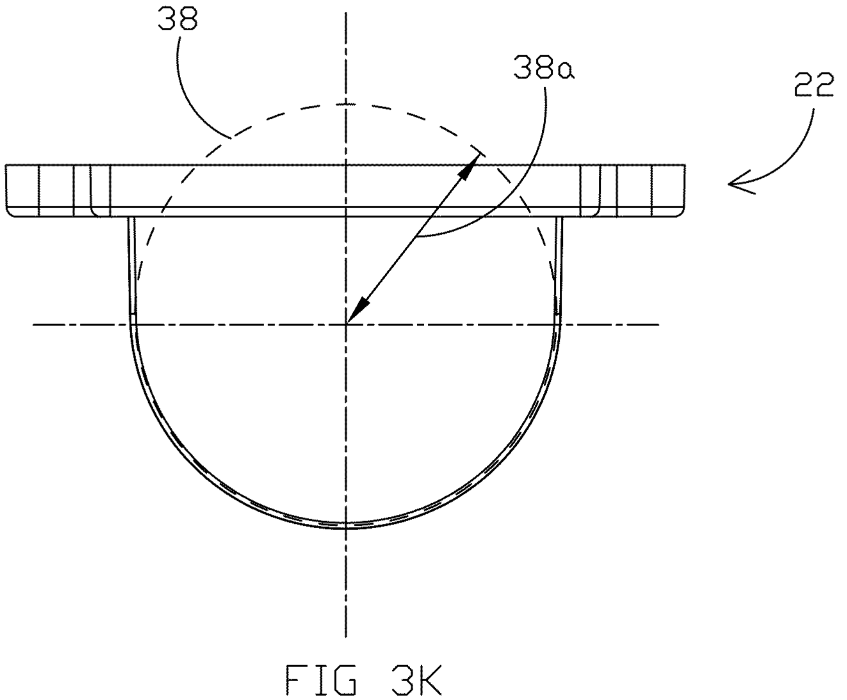
Figure 3L:
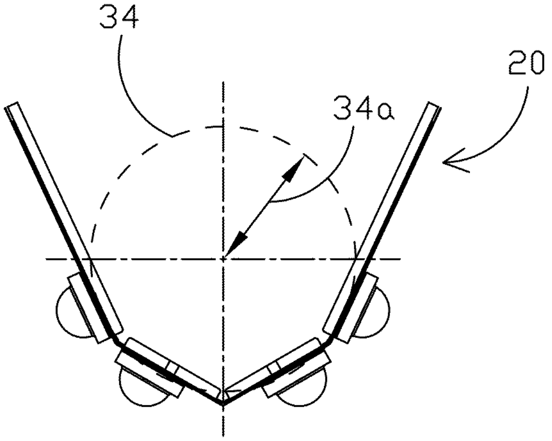

FIG. 3K illustrates the approximate scale of the compact light source 10. Circle 38, having a radius 38*a* which is on the order of one inch, represents a circle of approximately two inches in diameter, and is superimposed for illustration purposes on a view of cover 22 (FIG. 2A) of module 10. Similarly, circle 34, FIG. 3L, having a radius 34*a* which is on the order of one-half inch, represents a circle of approximately one inch in diameter, and is superimposed for illustration purposes on a view of circuit board 20. Size may be varied according to LED size and other factors, however it is important to note that this embodiment provides a very compact light source such as is needed in the industry.

The circuit board 20, FIG. 2A, is positioned within the light module or source 10 by the geometry of the mounting base 15 and cover 22. Mounting base 15 can function as a heat sink as necessitated by operating conditions and LED design.

Figure 2B:
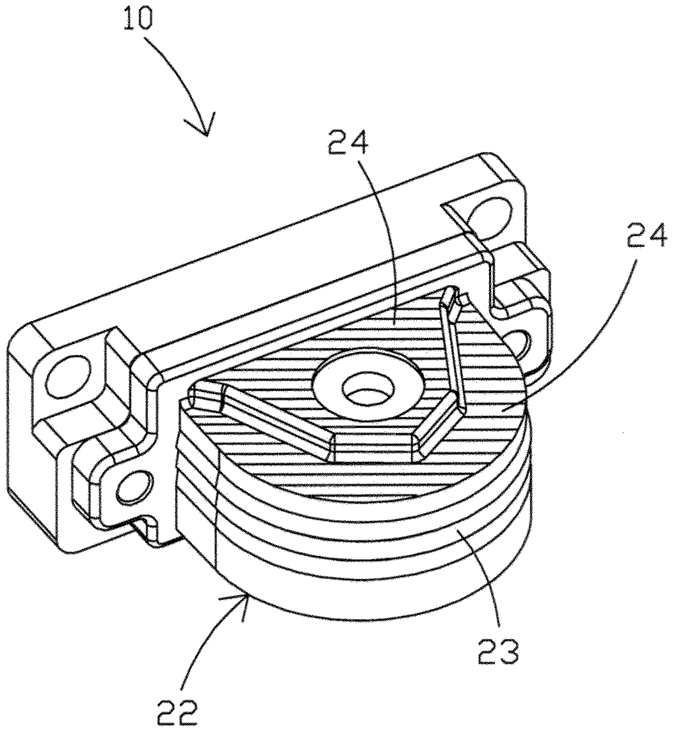
Figure 2C:
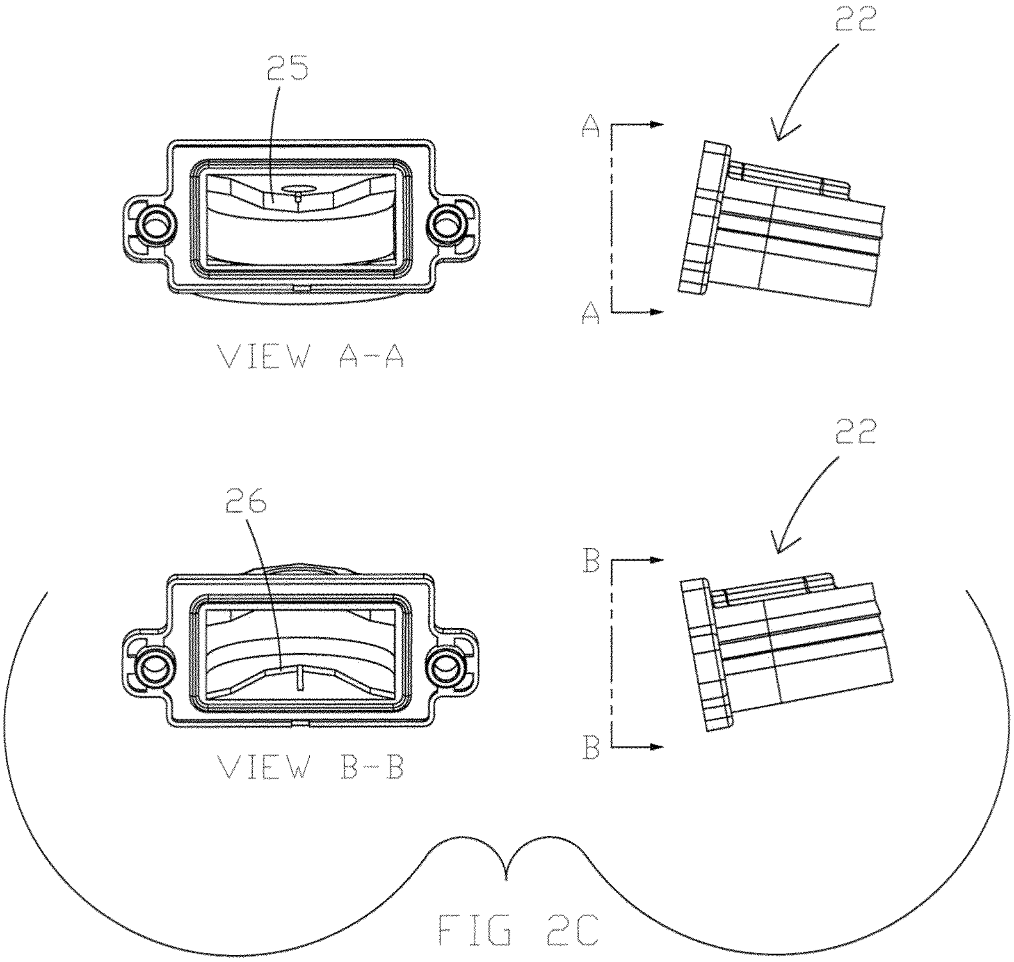
Figure 2D:
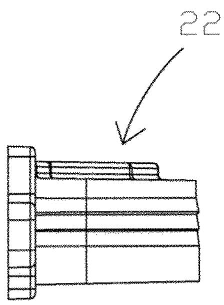

Inner surface of boss 25, FIG. 2C, and a corresponding boss 26 on the lower face of the housing effectively positions and holds board 20 on base 15. Cover 22 may be entirely transparent or translucent to transmit light, or it may contain a separate lens area 23, FIG. 2B. Lens area 23 may optionally help to diffuse light from the individual LEDs, or to provide other control of light distribution. However, because of the individual position of the LED light sources, a lens area 23 is not required. Gasket or seal 17, FIG. 2A may optionally be used. Bolts 19 and nuts 18, FIG. 2A may be used to retain cover 22 to base 15 through mounting holes 14 and 16, and to retain the base 15 to its mounting location through mounting holes 13 (to mount module 10 to a support or other component). Of course many other types of fasteners may be used as well. Hole 12 is optionally included to allow venting or drying of any moisture that accumulates or condenses inside cover 22. Through holes 9 allow electrical leads (e.g., 91 and 92, FIG. 3A) from circuit board 20 to pass out of base 15.

Figure 2E:
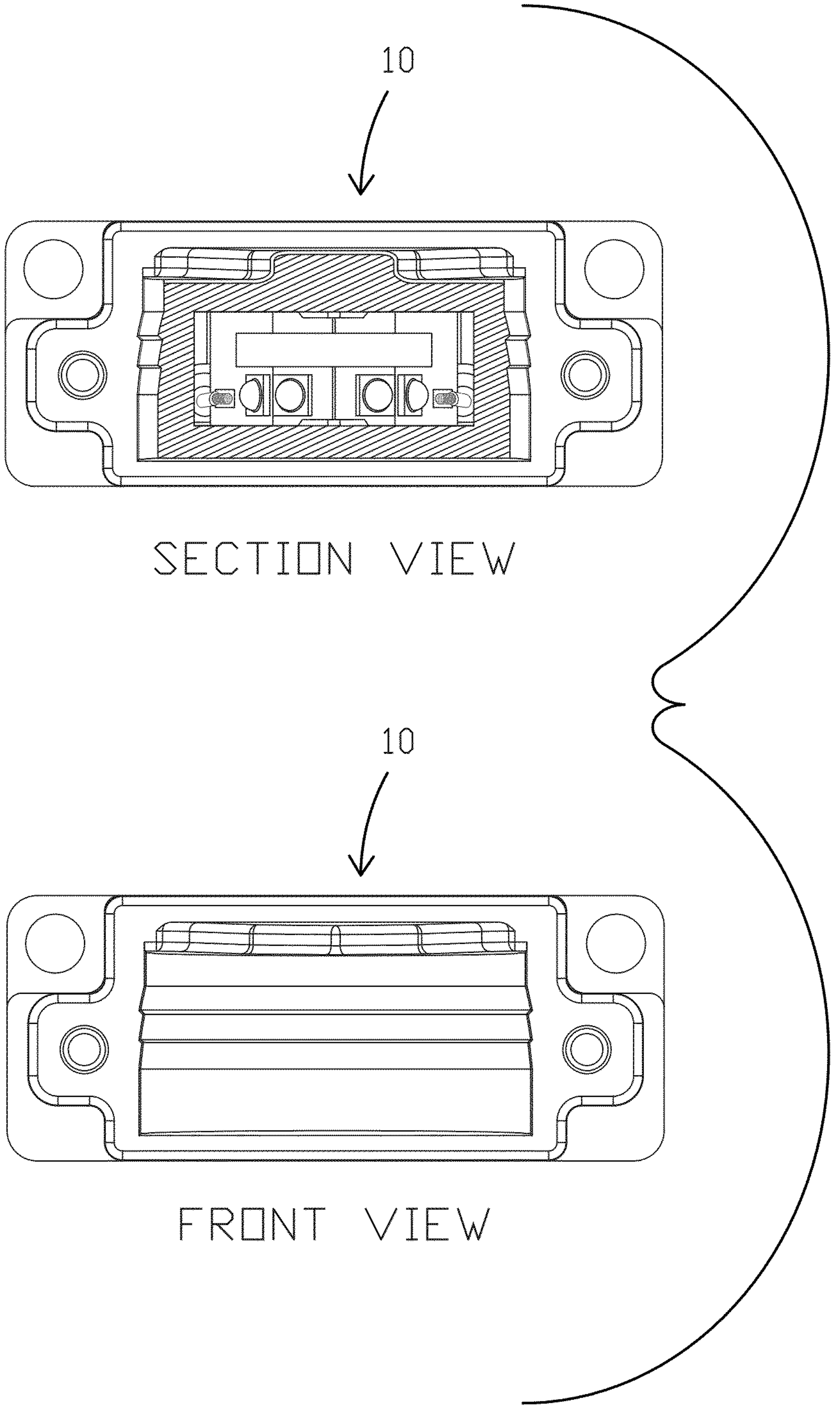
Figure 2F:
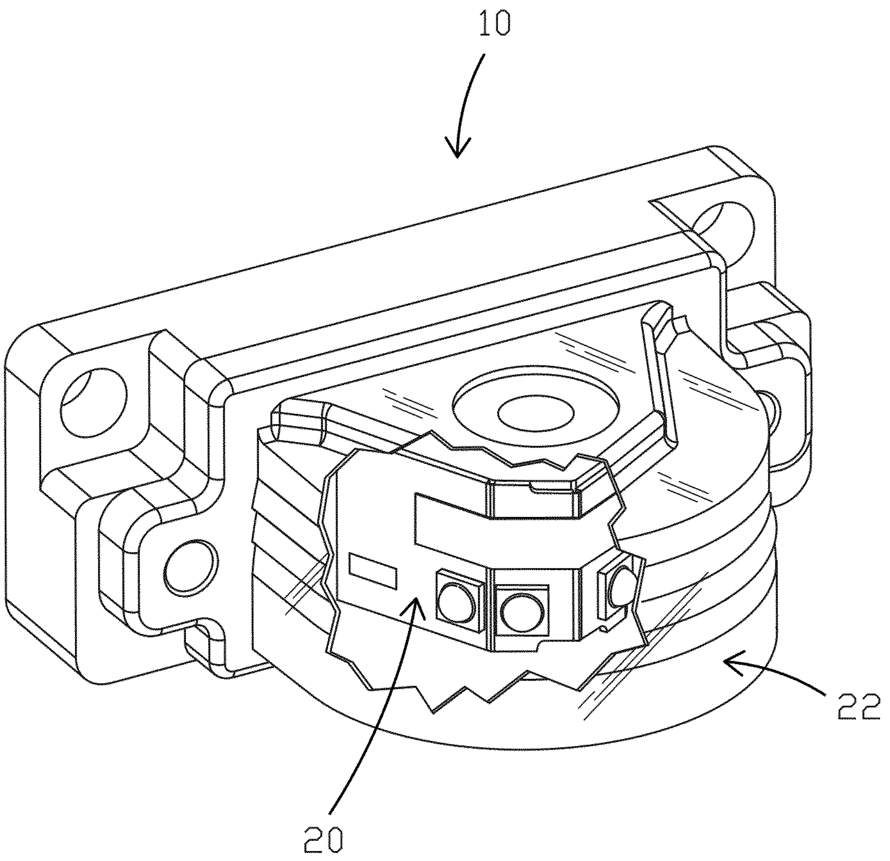

FIGS. 2E-2F provide additional views of the assembled compact light source.

A reflective or opaque coating or insert 24, FIG. 2B, may be affixed to part or the entire upper surface of lens 23. Additional optics 21, such as are known and/or commercially available in the art, FIG. 3I, may be installed on or juxtaposed to LEDs 30.

Figure 5A:
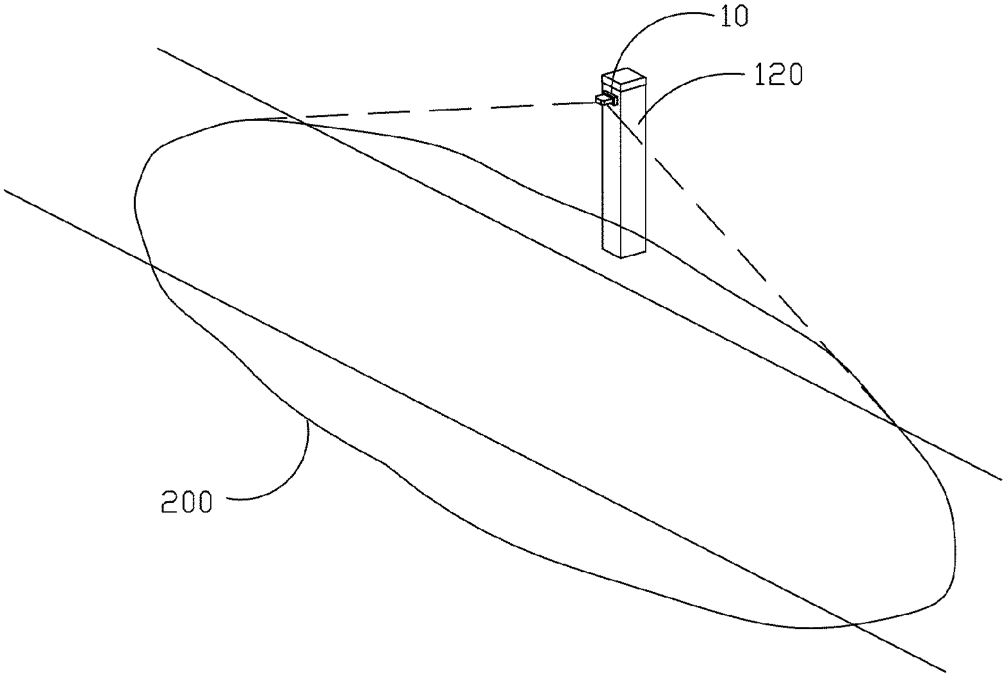
Figure 5B:
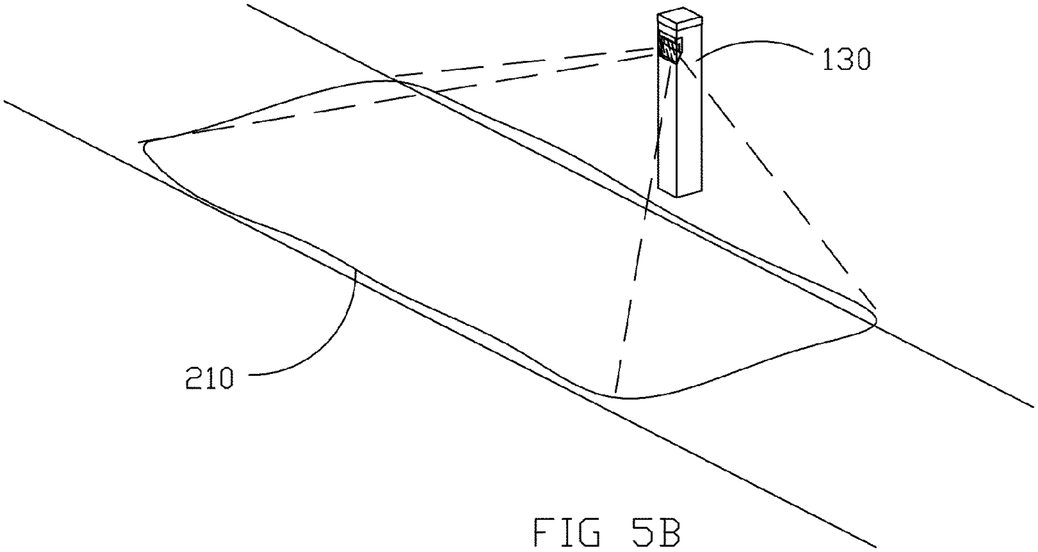

Module 10 serves to direct light both horizontally and vertically as shown in FIGS. 5A and 5B. FIG. 5A shows module 10 outside and along a vertical side of post 120 (see FIG. 10A). FIG. 5B shows a post 130 where the module 10 would be inside (see FIG. 10C). Light from the circuit board is directed horizontally to provide an approximately semicircular distribution around the light source, i.e. approximately 90 to 100 degrees to either side of the vertical plane through the center of the light source. Light from the circuit board may be directed downward by the lens 23 and/or coating/insert 24 to cut off all or substantially all light above a plane that is approximately horizontal through the top of the light source. Alternatively, or additionally, light directed near or above the horizontal axis may be blocked, reflected, or cut off by a "pattern control optic" as described below.

Figure 5C:
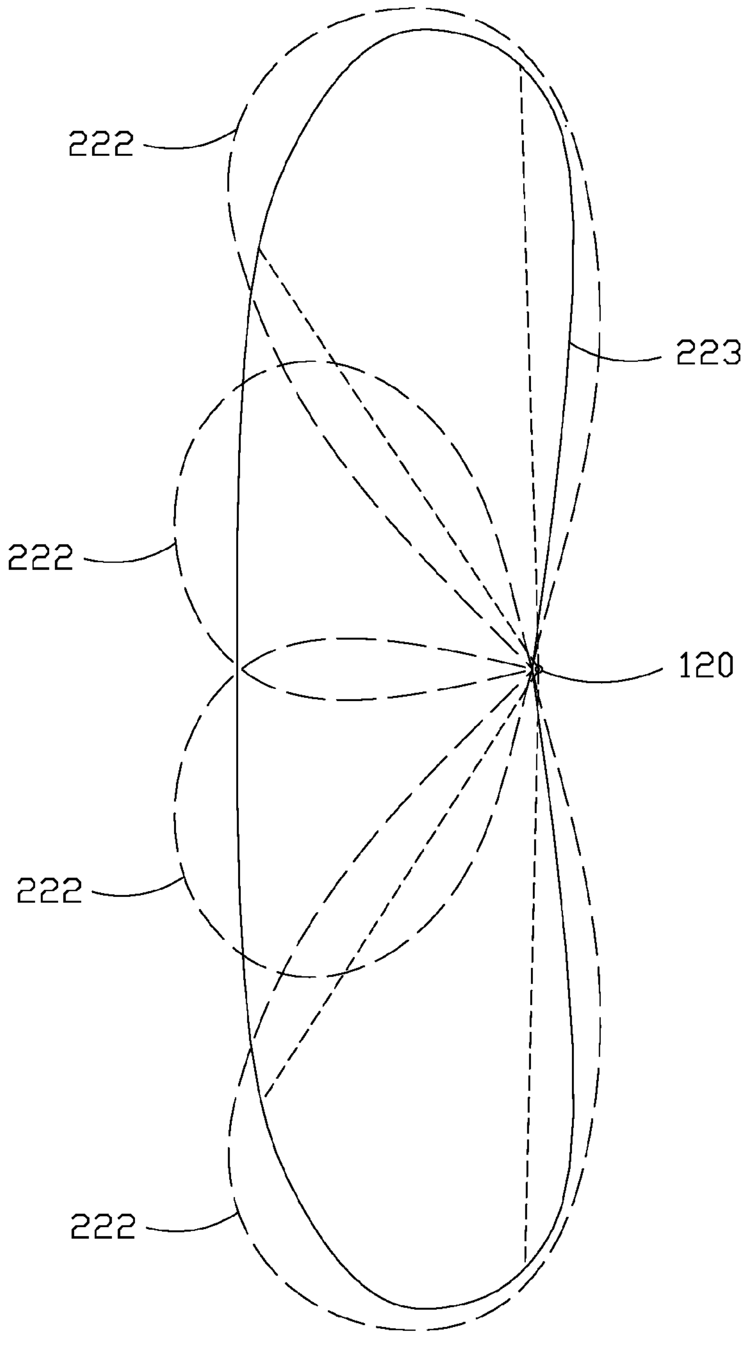

FIG. 5C shows a plan view of a typical light output illustrated in FIG. 5A. The combined beam pattern 223, FIG. 5C, which corresponds to beam pattern 200, FIG. 5A, is composed of individual beam patterns 222 which are projected from the individual LEDs 30 within the compact light source 10 mounted in bollard post 120. In some cases, for smooth blending, the perimeter of beam patterns 222 from the LEDs represent a brightness level of approximately 50%, which results in a visually smooth blending of the light from the individual LEDs. Selection of LEDs and relative angles of the planes on which the LEDs are installed may of course vary depending on the beam pattern desired, desired installation height, or other factors. FIG. 3J illustrates how light from the individual light sources is blended in order to provide smooth illumination about the compact light source. LEDs 30*a*-30*d* emit light in a pattern modeled by ray traces 11*a*-11*d* respectively. Light from adjacent LEDs (such as e.g. 30*a* and 30*b*) is blended together as it illuminates the target area.

The light source may be mounted to or within a fixture as part of an optic system which provides further control of the light pattern on a target area as illustrated in FIG. 5A or B. The related optic system may include a "pattern control optic" 100, FIG. 4 mounted in proximity to or contact with compact light source 10. It can be of box shape with open bottom and made of light blocking (e.g. opaque or substantially opaque) material. The pattern control optic may simply cut off of the edges of the beam, or may redirect (by reflection or otherwise) some or all of the light from the light source for a specific application. When used in a bollard light application as shown in FIG. 5B, typically the light would be constrained at approximately 30 degrees from horizontal in the direction of the path, and at an angle perpendicular to the path sufficient to cut off the light approximately at the opposite edge of the path. Alternatively, the pattern control optic may be of translucent or transparent material providing that a portion of the light is directed below horizontal as described herein. This would allow the pattern control optic to be visible to anyone in the area as (for example) a location or pathway marker, while still providing a large portion of the light to illuminate a pathway.

LEDs 30, FIG. 3A-3C, are affixed to a circuit board 40, FIGS. 3A and 3B. This can be the same or similar to circuit board 20. Some specifics of circuit board 40 are as follows. Circuit board 40 is constructed of an aluminum, copper, or other material base 80, FIGS. 3B and 3C, an electrically insulative thermal interface material 60, and typical copper traces 70 for control of the LEDs. (Alternatively, base 80 may also be constructed of other materials such as zinc die-cast, glass-filled nylon, FR-4 (woven glass/epoxy), FR-6 (matte glass/polyester), etc., provided that sufficient cooling is available for the LEDs.) The circuit board 40 may have grooves 50, FIGS. 3B and 3C, machined or formed on the back side in a fixed relationship to the location of the LEDs, to aid in forming the board, such that it may be formed or shaped to become internal light board 20, FIG. 2A. When this is done the LEDs will each be on a panel at a specific angle relative to the board and the housing.

After forming, board 20, FIG. 2A, is then installed in the compact light source 10, which is designed to provide precise location of the LEDs. Board 20 is held in place by the cover 22. Other type of retention methods could also be used, such as a snap- or interference-fit onto base 15, adhesives, screws, rivets, ultrasonic welding, etc.

When board 40 is formed, traces 70, FIG. 3B, may be subject to stress which is sufficient to cause the traces to fracture. To overcome this, flexible printed circuit strip 75, FIG. 3D (sometimes known as an FPC), is applied to board 40, FIG. 3A-3B to provide power for the LED. The flexible circuit is soldered to pads on the board prior to shaping the board. This FPC circuit allows the board to be bent without fracturing the circuit traces. Strip 75 consists of a non-conductive flexible substrate 33 with separate conductive traces 32. Each trace has solder pads 31 for soldering to corresponding solder pads 36 on board 40, FIG. 3E.

FPC products are widely available. Examples include, but are not limited to the "Flexbase" PET product, available from Sheldahl corporation of Northfield, Minn. (USA) and DuPont™ Kapton® polyimide from DuPont corporation, Wilmington, Del. (USA).

Circuit traces may be of conventional printed circuit design if the grooves 50, FIG. 3B. is large enough and/or traces are flexible enough to withstand the board forming process without fracturing. Circuit traces may also be partially bonded to the circuit board, "jumpered" with wires, etc.

Power connections 91 and 92, FIGS. 3A and 3B, may be made through a suitable opening in the rear of the base 15 or elsewhere.

FIG. 3E shows board 40, prior to mounting LEDs 30 or flexible strips 75. FIG. 3F shows a schematic representation of the connection between board 40 and flexible strip 75. Solder pads 36 provide locations for electrically connecting to corresponding pads 31 on strip 75, and to power leads 91 and 92. Traces 35 electrically connect solder pads 36.

FIG. 3F schematically shows the electrical current path through board 40 and strip 75. Lines 37, FIG. 3F, schematically represent the solder connections made between pads 36, FIG. 3E, and pads 31, FIG. 3D. LEDs 30 are also represented schematically in FIG. 3F. Current travels in series as illustrated through power lead 91, through solder pads 36 and traces 35, LEDs 30, solder connections 37, and circuit strip traces 32, and out through power lead 92. Circuits could be connected in parallel or series/parallel as well.

Alternative means or methods for assembly could include forming the board 20, FIG. 2A integrally with mounting base 15, and/or with cover 22. Board 20 could be made of individual panels that are installed into or onto base 15 and electrically connected by flexible circuits 75, FIGS. 3D and 3F. LEDs and circuit components could be mounted directly on mounting base 15. Other variations are possible as well.

Available LEDs suitable for use with the invention can vary widely with regard to beam spread or beam angle, therefore, locations of the LEDs and angular positioning of the panels may be varied according to intended usage or specifications of the compact light source and will be affected by choice of LEDs. LEDs may be controlled by use of suitable controllers. One embodiment according to aspects of the invention uses four identical Cree model XPE LEDs, available commercially from Cree Inc., of Durham N.C. (http://www.cree.com/products/xlamp_xpe.asp). Other embodiments might vary either the specifications of the LEDs in order to vary the shape or intensity of the beam emitted from the light source 10, or might vary the output of identical LEDs by the use of multiple controllers, or by proportionally varying the power to each LED from a single controller.

Advantages of the compact light source according to aspects of the invention include providing a smooth spread of light about an axis using more than one LED source. This allows the light to be spread as a function of the physical positioning of the LEDs. This can simplify lighting design for a light source using multiple LEDs, since optics designed for a single LED typically cannot be used effectively with multiple distributed LEDs. Instead, the invention provides a simple means to use multiple LEDs, each effectively having its own optic. Additionally, a light cutoff system designed to cut off light from a single LED typically cannot be used with a multiple LED design without adverse effects.

Application

A primary application is envisioned to be as a light source for bollard-style lamps such as in FIGS. 5A-5C. The module 10, FIG. 1, mounted by itself on a bollard (post) such as 120, FIG. 5A, will project an elongated elliptical pattern 200 that approximates the area of a length of sidewalk. FIG. 5B illustrates the outline of the light 210 as it might be cut off when installed in a bollard type fixture 130 with appropriate optics. Optional optics (e.g., 100, FIGS. 4 and 10C) in the bollard 130, FIG. 5B, would further constrain the light from the light source by blocking or redirecting the light which would otherwise fall outside of the target area.

Figure 6A:
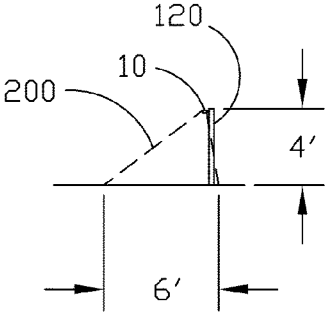
Figure 6B:
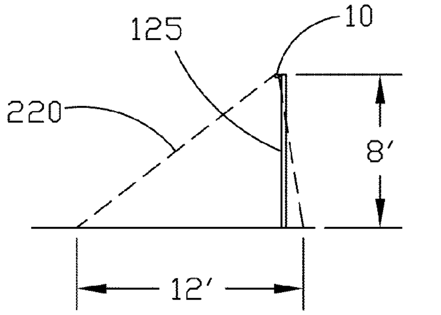
Figure 6C:
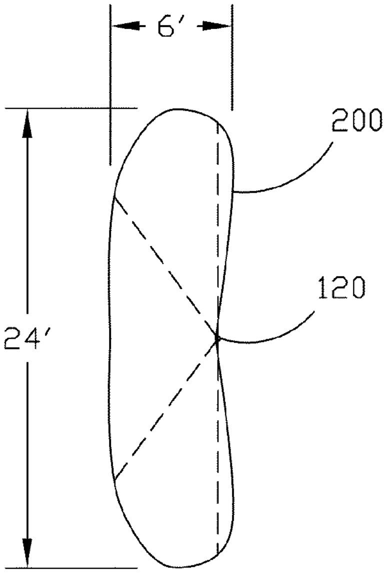
Figure 6D:
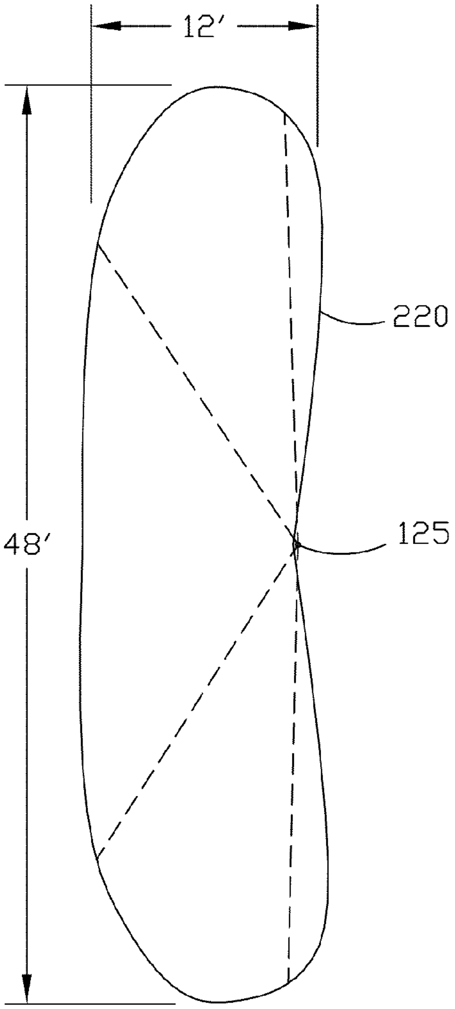
Figure 6E:
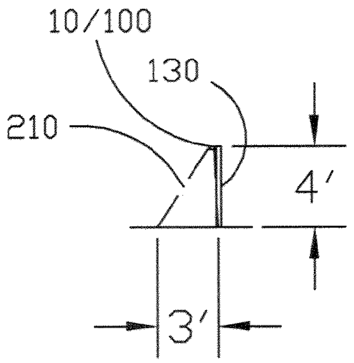
Figure 6F:
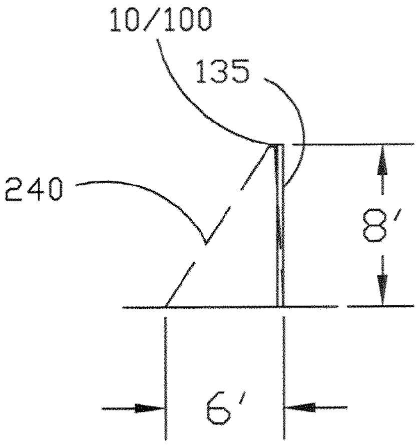
Figure 6G:
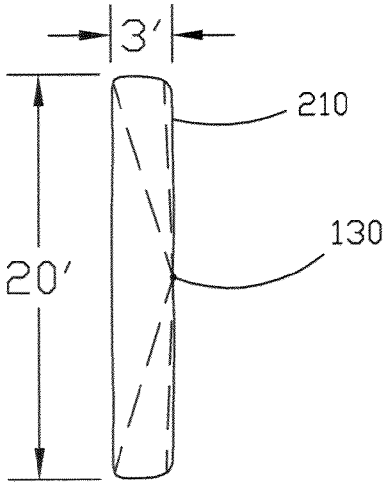
Figure 6H:
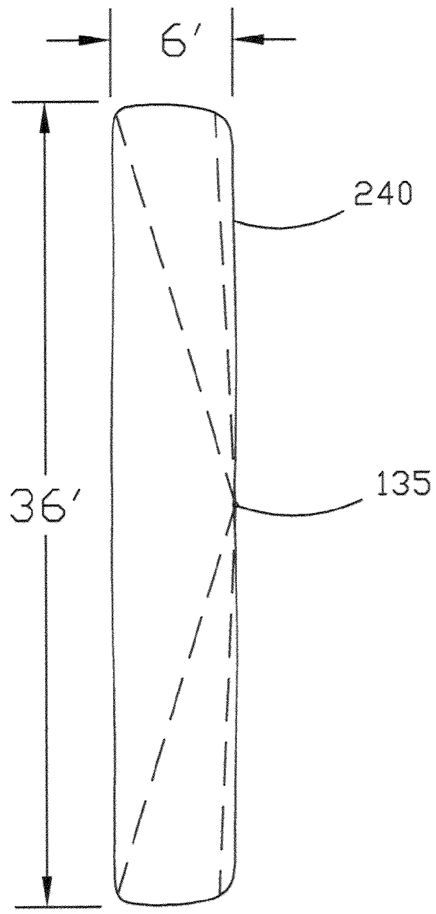

FIGS. 6A-D illustrate a light pattern from a compact light source 10 as described herein, installed without pattern control optic or aesthetic housing, at a two different heights (e.g. four feet and eight feet) on a structure. FIGS. 6A and 6C illustrate the outline 200 of the light pattern of the light source 10 when positioned at the height of a typical four-foot high bollard fixture 120. FIGS. 6B and 6D illustrate the outline 220 of the light pattern of the light source 10 when positioned at the height of an eight-foot high bollard fixture 125. FIGS. 6E-6H shows a similar layout, with a pattern control optic 100 modified to provide a narrower light pattern, installed within an aesthetic housing such as a bollard post 130 or 135. FIGS. 6E and 6G illustrate the outline 210 of the light pattern of the light source 10 when positioned at the height of a typical four-foot high bollard fixture 130. FIGS. 6F and 6H illustrate the outline 240 of the light pattern of the light source 10 when positioned at the height of an eight-foot high bollard fixture 135. It may be appreciated that given these options, a lighting designer has greater flexibility to design fixtures and calculate placement of bollards. This can help to provide complete coverage of a target area such as a walkway, while reducing or avoiding significant light spillage into adjacent areas.

Figure 7:
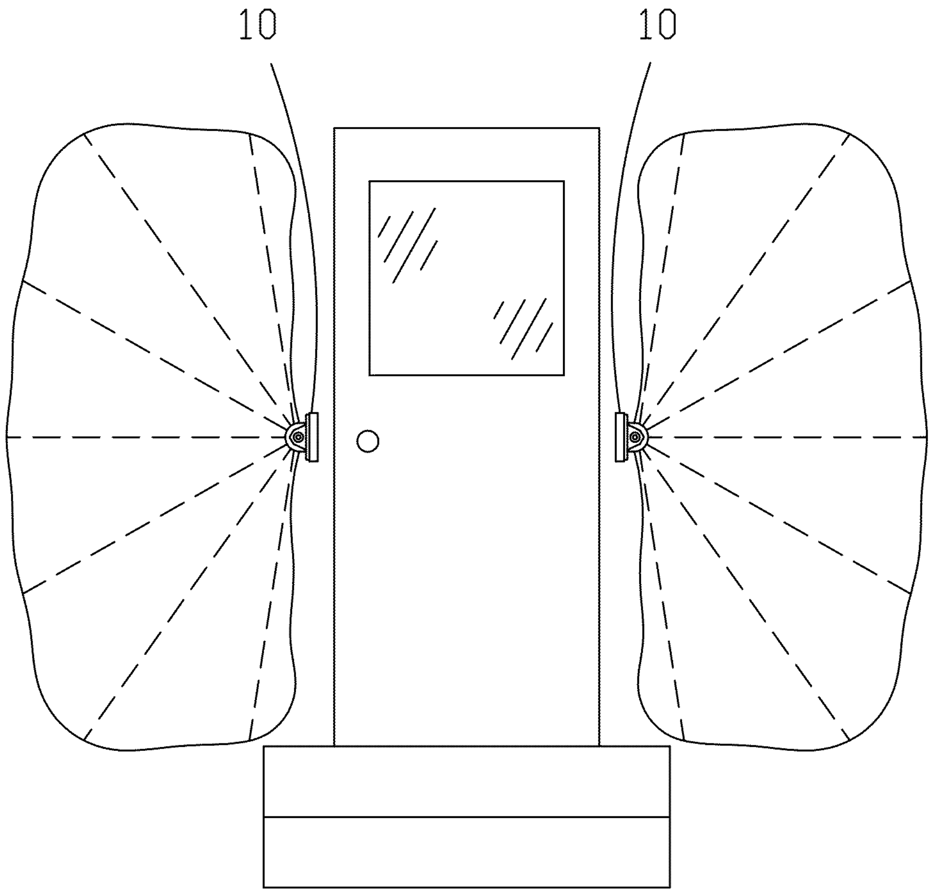
FIG. 7 illustrates diagrammatically an alternate use of a light module of FIG. 1 according to aspects of the current invention.

Of course, the light source 10 could be used with other style fixtures which might be found in public parks, along sidewalks, etc., and would readily be applicable to illuminating vertical surfaces such as walls or signs merely by changing its orientation as in FIG. 7 where two modules 10 are mounted on opposite sides of a door and aimed (e.g., mounted in vertical planes) to illuminate roughly rectangular areas on the vertical walls on opposite sides of the door.

C. Exemplary System

As envisioned, a lighting system such as might be used for aesthetic/architectural effect in a public area can be modified to allow the use of the compact LED light source module 10 (described herein) as a source of light. One use of said light source 10 is to illuminate paths of walkways, without substantially creating glare or unwanted light, such as described in U.S Pat. No. 8,256,921 or U.S Pat. No. 7,976,199, each of which is incorporated by reference herein.

To create a system of lighting, many variables relating to the light source and its associated optics may be controlled. The system envisioned herein facilitates providing for some of those variables in an aesthetically pleasing manner. For example, the light source may be adjusted as to its height from ground and its angle from horizontal. Optics such as lenses or visors may be adjusted as to their size, shape, position and angle relative to the light source.

One embodiment according to aspects of the current invention uses the compact LED light source 10, FIG. 1, as previously described, as part of an apparatus, method, or system to provide many desirable benefits. These benefits may include light that targets desired areas, reduces or eliminates unwanted light in non-target areas, and reduces or eliminates glare. Further benefits may include allowing considerable flexibility of design and aiming. A further benefit is the ability to provide lighting from within an attractive package that provides for external design of lighting fixtures to be identical or similar while varying internal optics to provide different light output capabilities.

The compact LED light source may be mounted on a structure at a specific distance from the ground, within an aesthetic housing such as a globe light fixture (150 FIG. 8) or bollard fixture (120, FIG. 5A, 130, FIG. 5B, 130/135 FIG. 10C).

Figure 8:
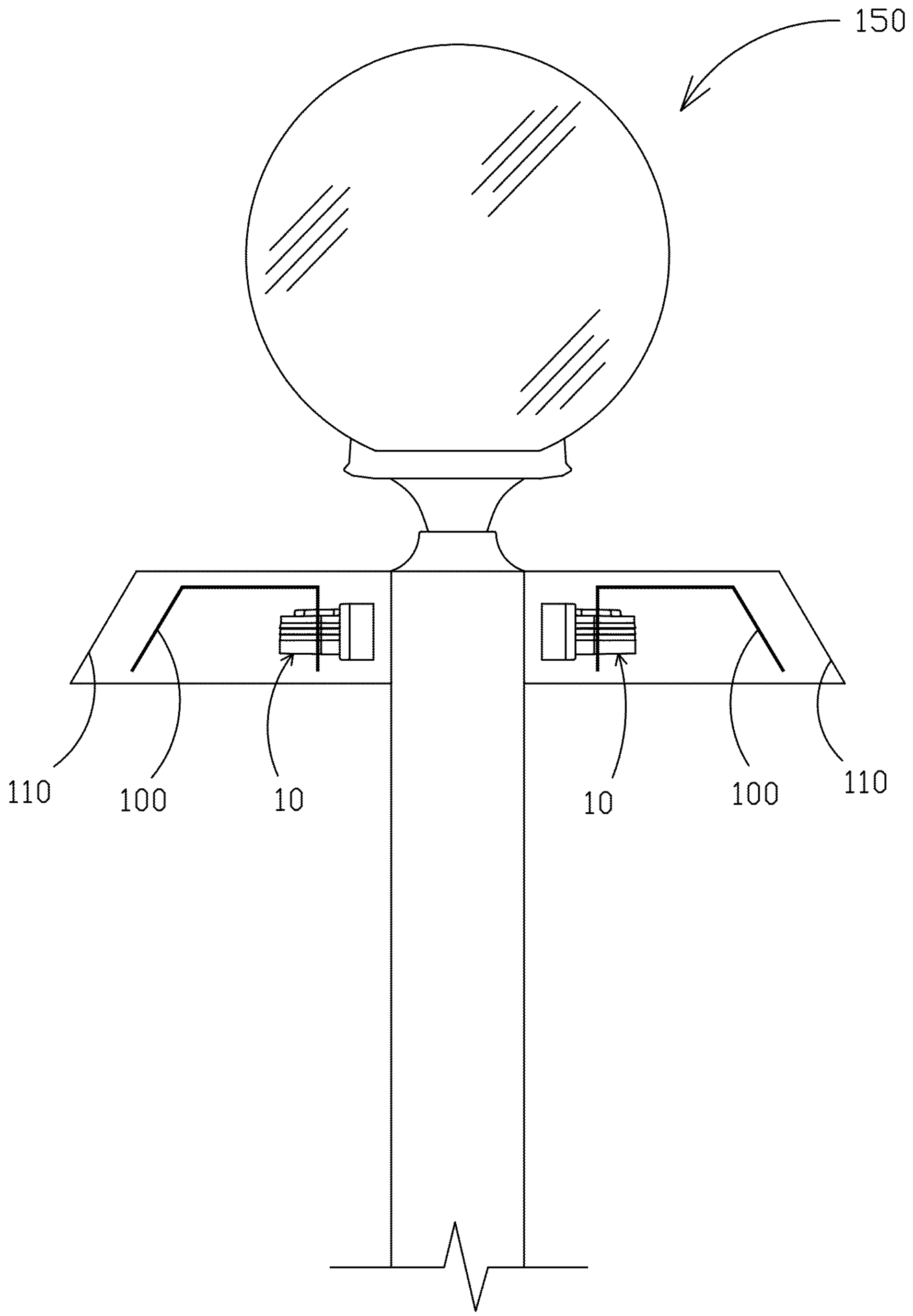
FIG. 8 illustrates a light fixture with plural modules of FIG. 1 according to aspects of the current invention.
Figure 9A:
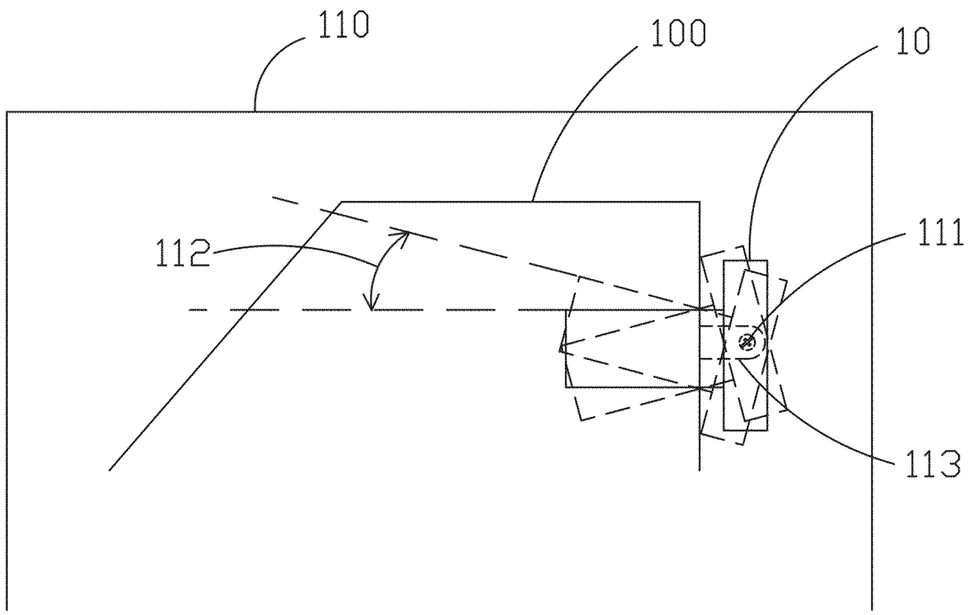
Figure 9B:
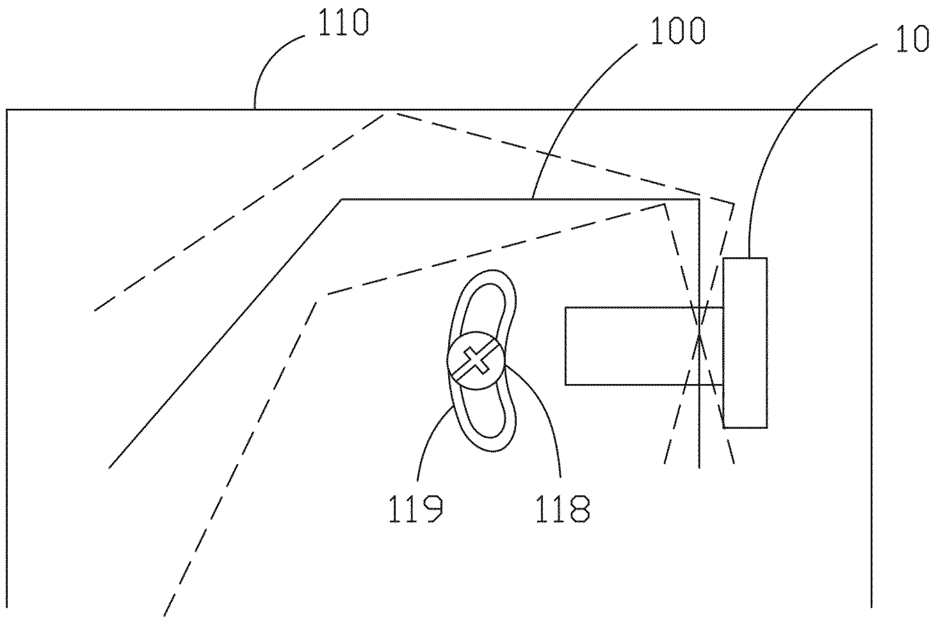
Figure 9C:
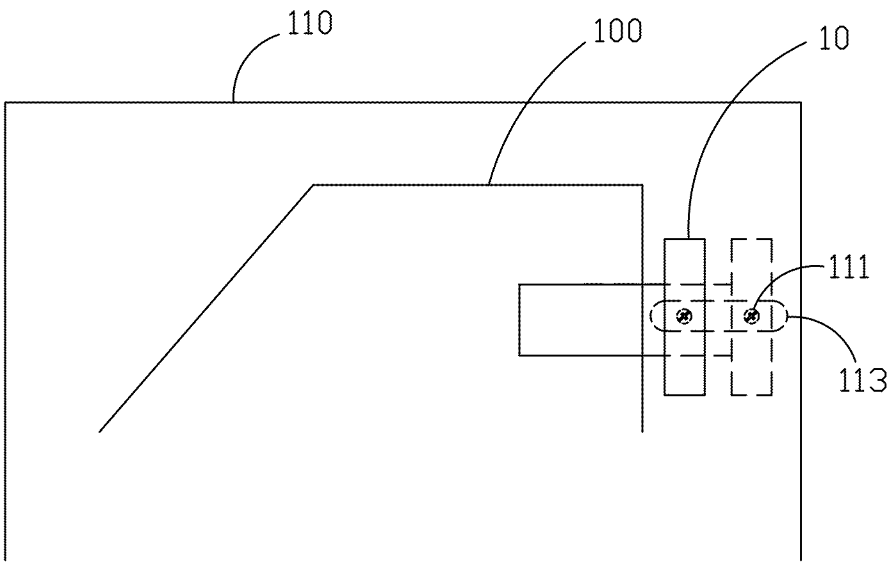
Figure 9D:
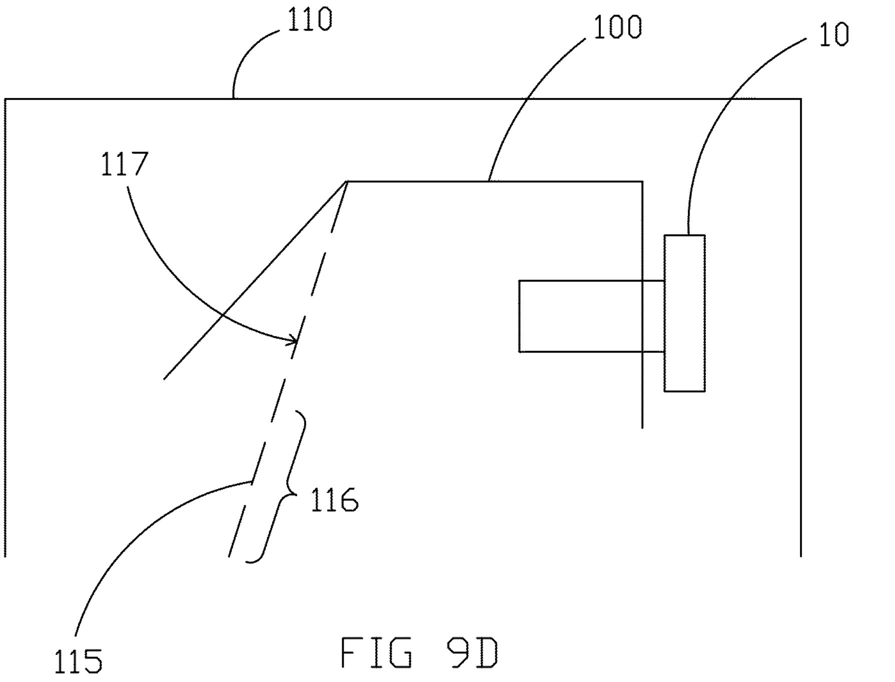

FIG. 9A-D illustrate how the positioning of light source 10 and pattern control optic 100 can be varied within an aesthetic housing 110. Additionally, the physical shape of the pattern control optic 100 can be changed, FIG. 9D. The angle and placement of the light source within the fixtures may be adjusted relative to the external aesthetic housing and relative to the optional optic. For instance, bolt 111, FIG. 9A, can allow sliding the light source 10 forward and rearward in slot 113, as well as allowing rotation of the light source about a horizontal axis. FIG. 9C also illustrates how bolt 111 and slot 113 allow horizontal adjustment of compact light source relative to the housing 110 or pattern control optic 100. For some purposes, positioning the light source at an angle 112, FIG. 9A, approximately 10° above horizontal provides an optimum light distribution. Secondly, a pattern control optic 100 (FIG. 4, also shown in FIGS. 8, 9A-D, and 10B in vertical section to more clearly show its interaction with light source 10), may be installed within the aesthetic housing having a configuration and position which is relative to the size, optical characteristics, and position of the light source. The pattern control optic can be opaque, reflective or a combination thereof.

In general, outside edges of the pattern control optic are used to somewhat sharply cut off the beam emitted by the light source. As an edge of the pattern control optic (e.g., 115, FIG. 9D) is lowered relative to the light source by, e.g., distance 116, or as it is brought closer, 117, to the light source, it will constrain the beam by blocking light that would otherwise illuminate a target area farther from the support structure. FIG. 9B illustrates how pattern control optic 100 might be adjusted within housing 110. Bolt or pin 118 attached to optic 100 moves within slot 119 in housing 110, allowing the optic to pivot vertically with reference to the light source 10 and the housing 110. Another method of varying the position of optic 100 would also be possible including changing the angle of the 'top' of optic 100 relative to the 'back' of the optic. Many other methods are possible.

Differently configured pattern control optics 100 might be manufactured according to these variations, or the optic might be made field-adjustable by bending, adjusting moveable panels, etc. Thus it is possible to make the emitted pattern very narrow for a narrow sidewalk with large spacing between posts along the sidewalk. Conversely, if the posts are installed next to a wider walkway or road, the pattern may be extended farther away from the pole or mounting structure, perpendicular to the direction of the walkway. For different effects, the pattern control optic can be moved in or out relative to the light source or it can have its angle from horizontal (or relative to the horizontal axis of rotation of the light source) changed, thereby affecting the shape of the light beam emitted from the aesthetic housing.

FIG. 10C illustrates light source 10 and optional optic 100 installed in a bollard type post 130/135. It may be seen that the light source in this case is hidden from normal view, while light from the light source is able to illuminate the sidewalk or pathway in front and on either side of the post.

One way to accomplish the preceding is to create a pattern control optic which is positioned within the aesthetic housing using the structural shape of the housing as a reference. The pattern control optic is further designed to interact with the beam from the light source, based on the position of the light source within the housing. Since the light source is also positioned relative to the aesthetic housing, a specific beam pattern will be emitted from the aesthetic housing, based on the relative positioning of the light source and the pattern control optic, and without necessitating a change in the shape of the standard fixture for the purpose of controlling the light pattern.

Alternatively, the pattern control optic may simply be fastened within, or manufactured as a part of, the aesthetic housing, using standard fastening and adjustment mechanisms such as slots or rails for in/out positioning and pivots or arc slots for rotational adjustment. Alternatively, the optic may be positioned in the fixture during manufacture in a position known to provide a given light pattern, which would then allow production of standard fixtures in different configurations or models for selection by the designer.

Thus, for a given aesthetic housing design, a lighting installation may be created which maintains the desired external appearance and which provides illumination which is targeted to a specific area. Records may be kept of installations so that similar installations may be performed by repeating or modifying installation specifications as appropriate. Also, standard components may be designed and manufactured which provide a wide range of pre-fitted components to provide standard beam shape such that lighting designers could specify a collection of architectural/aesthetic light structures/mounts (such as e.g. globe lights or bollard posts) with a standard internal pattern control optic to be used with (for example) a standard sidewalk width such as 4 feet, a standard pole placement such as every 20 feet. Different internal optics could be designed for curves, corners, wider or narrower sidewalks, extended pole spacing, etc.

Many options and alternative are possible: pattern control optic 100 may simply block unwanted light or may be patterned, specular, reflective, refractive, light absorptive, etc. in order to redirect or reuse light that is blocked or constrained. Pattern control optic 100 may be constructed out of aluminum sheet, molded thermoplastic, or various other materials. It may be vacuum formed, punched, etc. to provide a one piece interface between the aesthetic housing and the light source, or it may use intermediate mounting structures, have tabs, holes, etc. for appropriate mounting.

Examples are shown in use with bollard type aesthetic housings, but globe-style lights 150, FIG. 8, or any other style of light fixture may be used as an aesthetic housing. The aesthetic housing 110 can have a similar box shape (open bottom, closed top, and closed four side walls except for opening in back side wall for entry of light source 10) to the pattern control optic. In the case of a square or rectangular housing, the front wall of the housing may be configured having an angled front wall, similar to the pattern control optic 100, FIG. 4. It may also be non-angled (110, FIG. 9A). Housing 110 is shown in vertical section in FIGS. 8 and 9A-D to show its relationship to optic 100. Housing 110 in FIG. 8 presents an angled front as embodied in a circular fixture.

D. Options and Alternatives

The invention may take many forms and embodiments. The preceding examples are but a few of those. To give some sense of some options and alternatives, a few examples are given below.

For example, the method of mounting the LEDs might be changed. More or fewer LEDs might be used. Circuit boards might be formed before or after mounting the LEDs. LEDs might be mounted individually on the heat sink/base 15 or on individual boards 40 which are attached to the heat sink/base and connected by jumpers, flexible traces, etc. The circuit board might be scored, machined, extruded, or otherwise manipulated to create the folding lines. The cover 22 might have an aperture rather than a clear lens, or might have the cover, or might have tabs formed onto the ends so that the board could be fastened directly to the cover, or use some other means of mounting. The base, circuit board, and cover might be manufactured as an integral or interchangeable part of a fixture. Two or more LEDs might be mounted on each face of the circuit board. Many other variations are possible as well, and are expected as the utility and versatility of the invention is further developed.

The invention claimed is:

1. A compact LED light source module mounted to a surface and adapted to produce a composite light output pattern of defined shape and size comprising:

a. a thermally conductive base having at least four planar faces of different pre designed orientation relative the surface;

b. a thermally conductive substrate having at least four planar faces configured to correspond to the planar faces of the thermally conductive base;

c. one or more LEDs mounted to each planar face of the substrate, each LED producing an initial light output pattern projected outwardly from the surface at the pre-designed orientation of the planar face to which it is mounted;

d. a light transmissive cover encapsulating the LEDs, the light transmissive cover designed to modify at least one of the initial light output patterns;

e. the compact LED light source module pivotable relative the surface such that by selective design of the light transmissive cover and pivoting of the module said composite light output pattern of defined shape and size is produced; and f. wherein the compact module is installed in a bollard post.

2. The compact LED light source module of claim 1 further comprising a bendable mounting substrate that can be conformed to the pre-designed orientation of the faces of the base.

3. The compact LED light source module of claim 2 wherein the one or more LEDs are electrically connected in series via the bendable mounting substrate.

4. The compact LED light source module of claim 1 wherein the defined shape of the composite light output pattern is generally elliptical.

5. The compact LED light source module of claim 1 further comprising a pattern control optic positioned relative the surface such that the optic intercepts and reflects or absorbs at least a portion of the composite light output pattern and is adapted to provide a cutoff which affects the shape and size of the composite light output pattern.

6. The compact LED light source module of claim 5 wherein the pattern control optic is adjustable relative to the base such that the cutoff may be precisely controlled.

7. The compact LED light source module of claim 6 wherein the pattern control optic is pivotable about the base.

8. The compact LED light source module of claim 5 further comprising an aesthetic housing encapsulating the one or more LEDs and pattern control optic.

9. The compact LED light source module of claim 1 in combination with a light fixture and supporting structure.

10. A method of lighting a target area with a composite light output pattern comprising:

a. controlling orientation of four or more LEDs each mounted on a thermally conductive substrate having at least four planar faces corresponding to a thermally conductive base having four planar faces in a compact module relative the target area in a non-parallel and co-planar orientation, each LED adapted to produce an individual light output pattern, wherein the controlling of orientation is such that one or more individual light output patterns at least partially overlaps one or more other individual light output patterns so to produce a composite light output pattern;

b. controlling the composite light output pattern of the oriented LEDs with a device at the compact module, wherein the controlling of light output is such that the composite pattern is of a defined shape, wherein the device comprises a light transmissive cover encapsulating the LEDs, the light transmissive cover designed to modify at least one of the initial light output patterns;

c. mounting the compact module relative the target area on a bollard-type support, wherein the mounting is such that the composite light output pattern is of a defined size; and d. the compact LED light source module is pivotable relative the support such that by selective design of the light transmissive cover and pivoting of the module said composite light output pattern of defined shape and size is produced.

11. The method of claim 10 wherein the orientation is controlled by a mounting geometry in the module.

12. The method of claim 10 wherein the device comprises a lens.

13. The method of claim 10 wherein the device comprises a pattern control optic, wherein the pattern control optic comprises one or more reflective or light-absorbing surfaces.

14. The method of claim 10 further comprising utilizing a plurality of modules for a coordinated, illumination task.

15. A compact, adaptable system for illumination comprising:

a. at least four LED light sources each having a light output axis and a light output distribution pattern about the light output axis;

b. a compact mount for the at least four LED light sources so that the light output axes of the at least four LED light sources are non-parallel and co-planar, wherein a plane of the light output axis is parallel to a desired target location of the light output distribution pattern, the compact mount comprising a thermally conductive substrate having at least four planar faces corresponding to a thermally conductive base having four planar faces;

c. a light transmissive cover over the at least four LED light sources designed to modify at least one of the LED light source light output distribution patterns;

d. a cut-off component mounted at or near the cover and in at least a portion of one or more light output patterns so to cut-off a portion of said one or more output patterns;

e. the compact LED light source module is pivotable relative the support such that by selective design of the light transmissive cover and pivoting of the module said composite light output pattern of defined shape and size is produced;

f. so that customizable composite light output distribution patterns can be produced by selection of the at least four LED sources, their output distribution patterns, optical characteristics of the cover, positioning of the cut-off component, and direction of the optical axes of the at least four LED light sources.

16. The system of claim 15 further comprising additional optics on or with the at least four LED light sources to alter their output distribution patterns.

17. The system of claim 15 wherein the at least four LEDs are mounted in different planes, and their output axes project in different directions.

18. The system of claim 17 wherein the different planes result in the optical axes of the LEDs diverging from one another.

19. The system of claim 15 wherein the mount comprises a flexible circuit board.

20. The system of claim 19 further comprising a base having a geometry to receive and orient the flexible circuit board.

21. The system of claim 15 wherein the mount, at least four LEDs, and cover comprise a compact module of a few inches or less in length, width and depth.

22. The system of claim 21 further comprising a lighting fixture in which the compact module is mounted.

23. The system of claim 21 further comprising a lighting fixture in which plural compact modules are mounted.

24. The system of claim 22 wherein the lighting fixture comprises a bollard-type fixture.

25. The system of claim 15 wherein the composite output distribution pattern is elongated in a direction.

* * * * *